US012127287B2

(12) United States Patent
Sevindik

(10) Patent No.: US 12,127,287 B2
(45) Date of Patent: Oct. 22, 2024

(54) METHODS AND APPARATUS FOR PROVIDING BACKHAUL COMMUNICATIONS SERVICES

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/097,347

(22) Filed: Jan. 16, 2023

(65) Prior Publication Data

US 2023/0180324 A1 Jun. 8, 2023

Related U.S. Application Data

(63) Continuation of application No. 17/315,731, filed on May 10, 2021, now Pat. No. 11,589,412.

(51) Int. Cl.
*H04W 76/16* (2018.01)
*H04L 9/40* (2022.01)
*H04W 24/08* (2009.01)

(52) U.S. Cl.
CPC ........... *H04W 76/16* (2018.02); *H04L 63/164* (2013.01); *H04W 24/08* (2013.01)

(58) Field of Classification Search
CPC ...... H04W 76/16; H04W 24/08; H04L 63/164
USPC ...................................................... 455/426.1
See application file for complete search history.

(56) References Cited

U.S. PATENT DOCUMENTS

| 9,949,133 | B2* | 4/2018 | Ashrafi | H04L 41/0895 |
|---|---|---|---|---|
| 11,039,366 | B2* | 6/2021 | Hong | H04W 36/30 |
| 11,368,862 | B2* | 6/2022 | Ashrafi | H04W 84/18 |
| 11,638,319 | B2* | 4/2023 | Jeon | H04L 45/28 |
| | | | | 370/216 |
| 11,950,124 | B2* | 4/2024 | Chen | H04W 28/0263 |
| 2020/0245210 | A1* | 7/2020 | Fotheringham | H04W 36/14 |
| 2021/0045037 | A1* | 2/2021 | Wei | H04W 40/22 |
| 2023/0308853 | A1* | 9/2023 | Ding | H04W 4/40 |
| 2024/0155435 | A1* | 5/2024 | Karapantelakis | H04W 28/24 |

* cited by examiner

*Primary Examiner* — Mong-Thuy T Tran
(74) *Attorney, Agent, or Firm* — Straub & Straub; Stephen T. Strub; Michael P. Straub

(57) ABSTRACT

The present invention relates to methods and apparatus for providing backhaul communications. An exemplary method embodiment includes the steps of: determining, by a first wireless base station of a first wireless network, whether a first backhaul connection path between the first wireless base station and a core network entity of a first service provider includes a communications link which is part of a second network being operated by a different service provider; determining, by the first wireless base station, data transmission latency between the first wireless base station and the core network entity using the first backhaul connection path; establishing, by the first wireless base station, a second backhaul connection path between the first wireless base station and the core network entity, said second backhaul connection including a wireless connection to a second wireless base station which is part of the first wireless network.

20 Claims, 19 Drawing Sheets

| FIGURE 6A |
|---|
| FIGURE 6B |
| FIGURE 6C |
| FIGURE 6D |

FIGURE 6

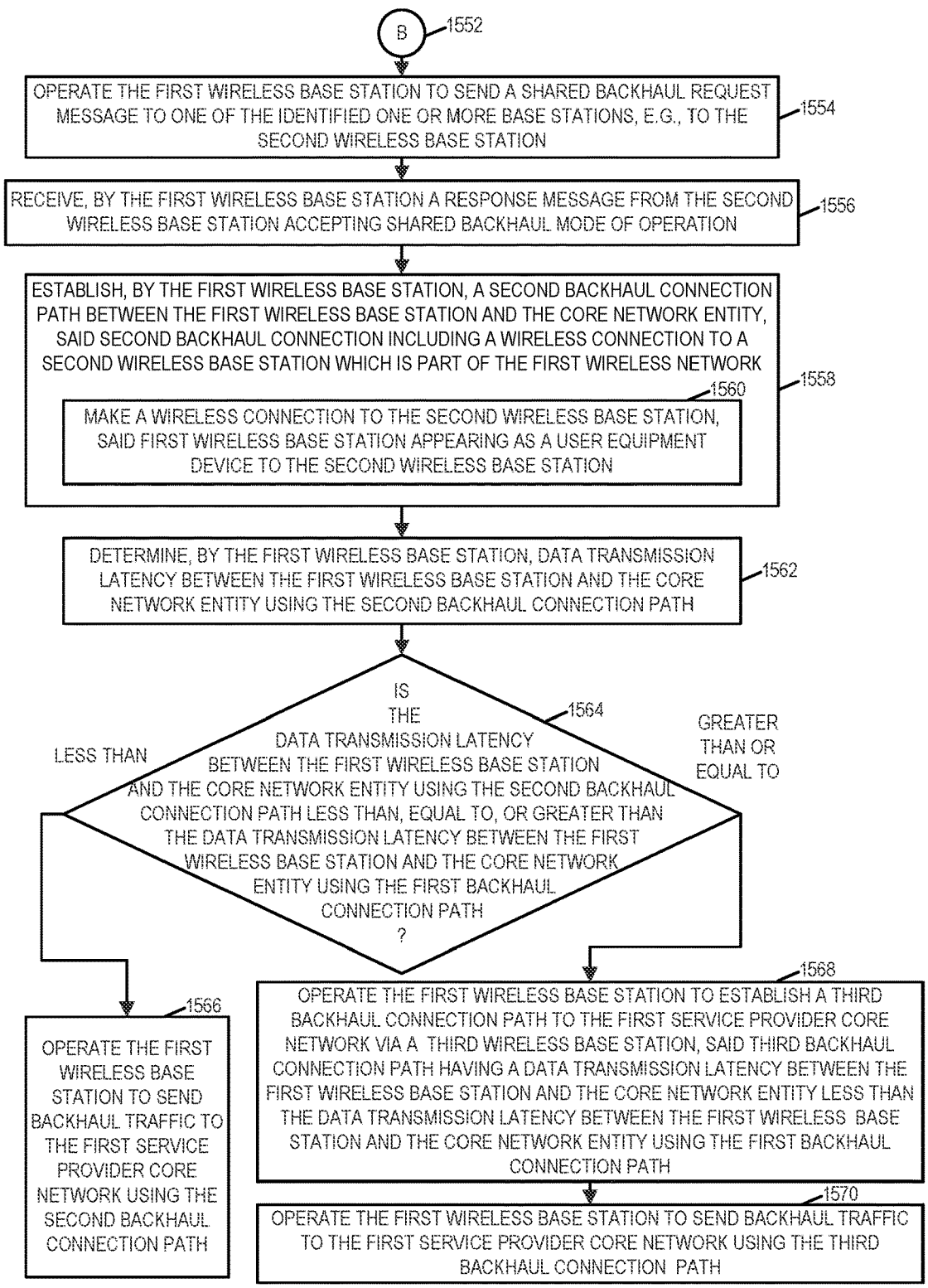

METHODS AND APPARATUS FOR PROVIDING BACKHAUL COMMUNICATIONS SERVICES

RELATED APPLICATIONS

The present application is a continuation of U.S. patent application Ser. No. 17/315,731 which was filed on May 10, 2021 which published as U.S. Patent Application Publication No.: US 2022-0361271 A1 on Nov. 10, 2022 and which is hereby expressly incorporated by reference in its entirety.

FIELD OF INVENTION

The present invention relates to methods and apparatus for providing backhaul communications services. The present invention also relates to methods and apparatus of operating a wireless base station to provide secure backhaul communications services for user equipment devices to which it is providing services. The present invention further relates to methods and apparatus for providing secure backhaul services in 5G wireless networks such as new radio 5G Citizens Broadband Radio Service (CBRS) Wireless Networks. The present invention further relates to methods and apparatus for reducing latency or delay for communications between a service provider's wireless base station and core network.

BACKGROUND OF THE INVENTION

One of the main challenges that wireless service providers face during network deployment is the requirement to utilize an encryption protocol (e.g., Internet Protocol Security (IPSec with encryption) to provide security on communications, e.g., backhaul communications, between a wireless base station, e.g., gNB and/or Citizen Broadband Radio Service Device (CBSD), and the core network if the connection between the wireless base station and the core network is unsecure. There are many instances in which a wireless service provider may not have a secure backhaul connection between the wireless base station and the core network at locations at which wireless base stations are deployed.

For example, in a small business deployment model, the wireless service provider does not control the cable service provider that the small business has available or prefers to use. Whenever a small business in which a wireless base station, e.g., gNB, is deployed uses a cable provider other than one owned and/or operated by the wireless service provider, then the wireless service provider must use an encryption protocol on the backhaul data before communicating it over the cable providers network. Typically, the wireless service provider creates an IPSec tunnel with encryption between the wireless base station and the wireless service provider's core network for use in communicating backhaul data.

Similarly, issues arise in fixed wireless access (FWA) deployments. When a wireless service provider wishes to deploy and extend their fixed wireless access service coverage, then they may in some instances rent a fiber, optical or cable connection from another service provider if they do not have a fiber, optical or cable connection to their core network because for example they do not provide such services in that market. IPSec with encryption or another security protocol is then used to secure the communication between the fixed wireless access base station and the wireless service provider's core network. However, one of the drawbacks is that IPSec and other encryption protocols introduce additional headers to the user data which the wireless base station, e.g., gNB, is sending and receiving to/from the wireless service providers core network which causes additionally data latency in both communication to the core network from the wireless base station and from the core network to the wireless base station.

From the above it should be appreciated that there is a need for new and/or improved methods and apparatus for providing backhaul communications from a service provider's wireless base station to a core network when the communications link is unsecure. There is a further need for new and/or improved methods and apparatus for reducing and/or minimizing delays and/or latency for backhaul communications between wireless base stations and the core network when the backhaul communications link between the wireless base station and the core network are not owned by the same service provider or is unsecure.

SUMMARY OF THE INVENTION

The present invention provides a technological solution of how to efficiently and effectively provide backhaul communications from a wireless base station in a secure manner while reducing and/or minimizing the delay and/or latency of the backhaul communications. The present invention also provides new and/or improved methods and apparatus for identifying other backhaul communications paths when the delay of a first backhaul communications path does not meet the needs or requirements of the service provider. Various embodiments of the present invention include novel methods and apparatus to solve one or more of the problems identified above.

An exemplary method embodiment in accordance with the present invention includes performing the following steps: determining, by a first wireless base station of a first wireless network, whether a first backhaul connection path between the first wireless base station and a core network entity of a first service provider includes a communications link which is part of a second network being operated by a different service provider; determining, by the first wireless base station, data transmission latency between the first wireless base station and the core network entity using the first backhaul connection path; and establishing, by the first wireless base station, a second backhaul connection path between the first wireless base station and the core network entity, said second backhaul connection including a wireless connection to a second wireless base station which is part of the first wireless network.

In some embodiments, the first wireless base station is a gNB wireless base station.

In some embodiments, the first wireless network is a 5G wireless network. In some such embodiments, the first wireless network is Citizens Broadband Radio Service (CBRS) wireless network and the gNB wireless base station is a Citizens Broadband Radio Service Device (CBSD).

In various embodiments, the first wireless base station is a 5G Citizens Broadband Radio Service Device deployed inside a first building by a first customer or at a first fixed wireless access location.

In some embodiments, the different service provider of the method is a cable network service provider.

In some embodiments, the communications link of the method which is part of the second network is an optical (e.g., fiber-optic) or wired cable.

In various embodiments, the second backhaul connection is only established when the data transmission latency between the first wireless base station and the core network entity using the first backhaul connection path is greater than a first threshold. In some embodiments, the first threshold being a value which is an unacceptable delay for a customer or based on quality of service defined for a customer.

In various embodiments, the step of determining, by a first wireless base station of a first wireless network, whether a first backhaul connection path between the first wireless base station and a core network entity of a first service provider includes a communications link which is part of a second network being operated by a different service provider includes: determining that the first backhaul connection path includes a communications link which is part of second network being operated by a different service provider when said first wireless base station receives an Internet Protocol Security (IPSec) connection request from the core network entity.

In some embodiments, the step of determining, by the first wireless base station, data transmission latency between the first wireless base station and the core network entity using the first backhaul connection path includes: determining a Round Trip Time (RTT) or Round Trip Delay (RTD) between the first wireless base station and the core network entity; and dividing the RTT or RTD by two.

In some embodiments, the step of determining, by the first wireless base station, data transmission latency between the first wireless base station and the core network entity using the first backhaul connection path includes: determining by the first wireless base station a first period of time, said first period of time being a length of time from a transmission of a first data packet to the core network entity from the first wireless base station to the receipt by the first wireless base station of an acknowledgement from the core network entity that the core network entity received the first data packet; and dividing the first period of time by two.

In various embodiments, the method further includes the step of: receiving by the first wireless base station, from one or more user equipment devices physical cell identifiers (PCIs) of one or more wireless base stations, said one or more wireless base stations including the second wireless base station.

In some embodiments, prior to receiving from one or more user equipment devices physical cell identifiers (PCIs) by the first wireless base station, the method includes the step of sending by the first wireless base station a request to the one or more user equipment devices to measure and report PCIs being received by the one or more user equipment devices.

In various embodiments, the method includes the step of the first wireless base station obtaining from a first device in the first network, Internet Protocol addresses of the one or more wireless base stations having the PCIs received from the one or more user equipment devices, said one or more base stations being in the vicinity of the first wireless base station.

In some embodiments, the step of obtaining from a first device in the first network, Internet Protocol addresses of the one or more wireless base stations having the PCIs received from the one or more user equipment devices includes: (i) generating a list of the PCIs received from the one or more user equipment devices; (ii) sending a request to the first device in the first network with the generated list of PCIs requesting the Internet Protocol addresses of wireless base stations in the vicinity of the first wireless base station which are utilizing the PCIs included in the list of PCIs; (iii) receiving in response to the request to the first device in the first network, the Internet Protocol addresses of the wireless base stations in the vicinity of the first wireless base station which are utilizing the PCIs included in the list of PCIs.

In some embodiments, the first device is Access and Mobility Management Function (AMF) device in the first service provider's core network.

In some embodiments, prior to said establishing, by the first wireless base station, a second backhaul connection path between the first wireless base station and the core network entity: (i) operating the first wireless base station to ping (e.g., send a ping message) the one or more of the wireless base stations for which the first wireless base station received an IP address from the first device; (ii) operating the first wireless base station to monitor for responses to the ping messages sent to the one or more wireless base stations for which the first wireless base station received an IP address from the first device; (iii) operating the first wireless base station to receive one or more responses to the ping messages from one or more of the one or more wireless base stations to which a ping was sent; and (iv) operating the first wireless base station to determine that the wireless base stations from which a response to the ping message was received have backhaul resources available.

In various embodiments, prior to the step of establishing, by the first wireless base station, a second backhaul connection path between the first wireless base station and the core network entity, the method further includes the step of identifying by the first wireless base station one or more wireless base stations in the first wireless network in the vicinity of the first wireless base station which have backhaul resources available, said one or more wireless base stations including the second wireless base station.

In some embodiments, prior to the step of establishing, by the first wireless base station, a second backhaul connection path between the first wireless base station and the core network entity, the method includes sending a shared backhaul request message to one of the identified one or more wireless base stations.

In various embodiments, the one of the identified one or more wireless base stations is the second wireless base station.

In some embodiments, the method further includes the step of receiving by the first wireless base station a response message from the second wireless base station accepting shared backhaul mode of operation.

In most embodiments, the pings, the ping response messages, the shared backhaul request message, and the response message to the shared backhaul request message are all communicated over the first backhaul communications connection.

In various embodiments, the step of establishing, by the first wireless base station, a second backhaul connection path between the first wireless base station and the core network entity includes: making a wireless connection to the second wireless base station, said first wireless base station appearing as a user equipment device to the second wireless base station.

In some embodiments, the method further includes the steps of: determining, by the first wireless base station, data transmission latency between the first wireless base station and the core network entity using the second backhaul connection path; and determining whether the data transmission latency between the first wireless base station and the core network entity using the second backhaul connection path is less than, equal to, or greater than the data transmission latency between the first wireless base station and the core network entity using the first backhaul connection path.

In some embodiments when the first wireless base station determines the data transmission latency between the first wireless base station and the core network entity using the second backhaul connection path is less than the data transmission latency between the first wireless base station and the core network entity using the first backhaul connection path, the method further includes operating the first wireless base station to send backhaul traffic to the first service provider core network using the second backhaul connection path. In some such embodiments, the second wireless base station is typically operating in a shared backhaul mode of operation.

In some embodiments, when the first wireless base station determines the data transmission latency between the first wireless base station and the core network entity using the second backhaul connection path is greater than or equal to the data transmission latency between the first wireless base station and the core network entity using the first backhaul connection path, the method further includes operating the first wireless base station to establish a third backhaul connection path to the first service provider core network via a third wireless base station, said third backhaul connection path having a data transmission latency between the first wireless base station and the core network entity less than the data transmission latency between the first wireless base station and the core network entity using the first backhaul connection path.

Various apparatus disclosed herein include a processor and memory, the memory including instructions which when executed by the apparatus control the apparatus to perform one or more of the steps and/or functions described in connection with the various embodiments described herein.

In an exemplary wireless communications system embodiment includes: a first wireless base station of a first wireless network including: (i) memory; and (ii) a processor that controls the first wireless base station to perform the following operations: determining whether a first backhaul connection path between the first wireless base station and a core network entity of a first service provider includes a communications link which is part of a second network being operated by a different service provider; determining data transmission latency between the first wireless base station and the core network entity using the first backhaul connection path; and establishing a second backhaul connection path between the first wireless base station and the core network entity, said second backhaul connection including a wireless connection to a second wireless base station which is part of the first wireless network. In some such embodiments, the second backhaul connection is only established when the data transmission latency between the first wireless base station and the core network entity using the first backhaul connection path is greater than a first threshold.

In some embodiments the operation of determining whether a first backhaul connection path between the first wireless base station and a core network entity of a first service provider includes a communications link which is part of a second network being operated by a different service provider includes: determining that the first backhaul connection path includes a communications link which is part of second network being operated by a different service provider when said first wireless base station receives an Internet Protocol Security (IPSec) connection request from the core network entity.

In some embodiments, the operation of determining data transmission latency between the first wireless base station and the core network entity using the first backhaul connection path includes: determining the Round Trip Time (RTT) or Round Trip Delay (RTD) between the first wireless base station and the core network entity; and dividing the RTT or RTD by two.

In some embodiments, the operation of determining data transmission latency between the first wireless base station and the core network entity using the first backhaul connection path includes: determining by the first wireless base station a first period of time, said first period of time being a length of time from a transmission of a first data packet to the core network entity from the first wireless base station to the receipt by the first wireless base station of an acknowledgement from the core network entity that the core network entity received the first data packet; and dividing the first period of time by two.

In various system embodiments, the processor further controls the first wireless base station to perform the additional operation of: receiving from one or more user equipment devices physical cell identifiers (PCIs) of one or more wireless base stations, said one or more wireless base stations including the second wireless base station. The physical cell identifiers are then used by the first wireless base station to obtain contact information for wireless base stations in the vicinity of the first wireless base station from the core network. In some embodiments, the first wireless base station controlled by the processor communicates with the second wireless base station using the first backhaul connection and contact information obtained from the core network to request the second wireless base station provide shared backhaul services for the first wireless base station.

In some embodiments, the processor further controls the first wireless base station to perform the additional operations of: determining, by the first wireless base station, data transmission latency between the first wireless base station and the core network entity using the second backhaul connection path; and determining whether the data transmission latency between the first wireless base station and the core network entity using the second backhaul connection path is less than, equal to, or greater than the data transmission latency between the first wireless base station and the core network entity using the first backhaul connection path.

In some embodiments, the processor further controls the first wireless base station to perform the additional operation of: operating the first wireless base station to send backhaul traffic to the first service provider core network using the second backhaul connection path, when the first wireless base station determines the data transmission latency between the first wireless base station and the core network entity using the second backhaul connection path is less than the data transmission latency between the first wireless base station and the core network entity using the first backhaul connection path. In some embodiments, the second wireless base station operates in shared backhaul mode of operation when providing backhaul services for the first wireless base station.

In some embodiments, the processor further controls the first wireless base station to perform the additional operation of: establishing a third backhaul connection path to the first service provider core network via a third wireless base station, when the first wireless base station determines the data transmission latency between the first wireless base station and the core network entity using the second backhaul connection path is greater than or equal to the data transmission latency between the first wireless base station and the core network entity using the first backhaul connection path; and wherein said third backhaul connection path has a data transmission latency between the first wireless base station and the core network entity less than the data transmission latency between the first wireless base station and the core network entity using the first backhaul connection path.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 6 comprises the combination of FIG. 6A, FIG. 6B, FIG. 6C and FIG. 6D.

FIG. 14C is a third part of a flowchart of another exemplary communications method in accordance with an exemplary embodiment.

FIG. 14 comprises the combination of FIG. 14A, FIG. 14B, and FIG. 14C.

DETAILED DESCRIPTION

The current invention is applicable to wireless networks, e.g., new radio 5G wireless networks and Citizens Broadband Radio Service (CBRS) networks, that provide wireless communications services, e.g., broadband services, to wireless devices, e.g., user equipment devices/mobile terminals such as wireless sensors, smartphones, cell phones, laptops, media players, vehicles including one or more wireless terminals such as sensors, controllers and communications devices. The present invention provides new and/or improved methods and apparatus for providing backhaul communications from a wireless base station to a core network in a secure manner while minimizing transmission delay latency. While the invention is explained using an exemplary 5G network such as Citizens Broadband Radio Service network, it should be understood that the invention is not limited to 5G networks or Citizens Broadband Radio Service networks.

Figure 1:
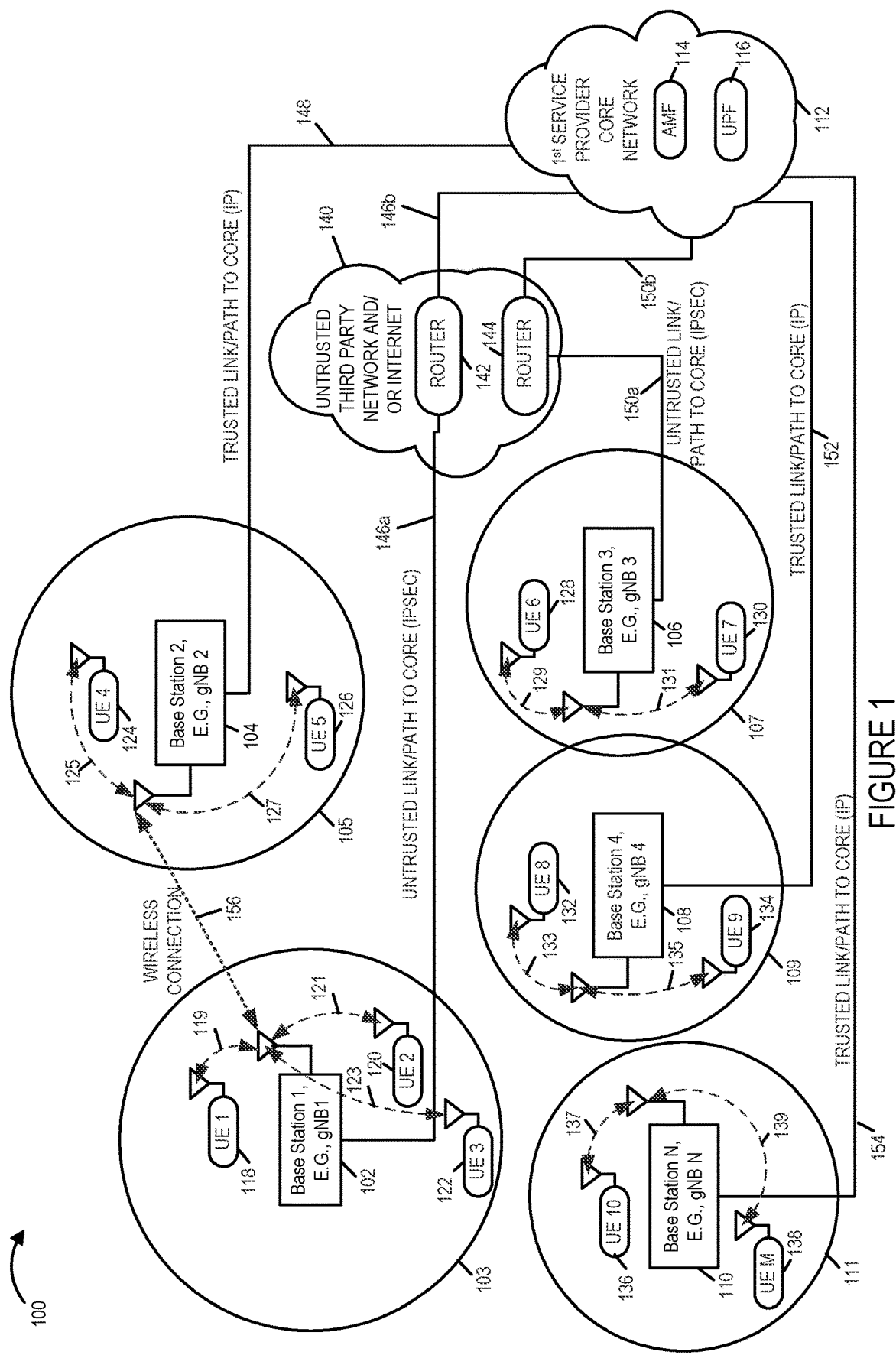
FIG. 1 illustrates an exemplary communications system in accordance with one embodiment of the present invention.

FIG. 1 is a drawing of an exemplary communications system 100 in accordance with an exemplary embodiment. Exemplary communications system 100 includes a plurality of base stations (base station 1 102, base station 2 104, base station 3 106, base station 4 108, . . . , base station N 110). In some embodiments, the base stations (102, 104, 106, 108, 110, . . . , 112) are gNB base stations. In some embodiments, the base stations (102, 104, 106, 108, 110, . . . , 112) are Citizens Broadband Radio Services Device (CBSD) base stations, e.g., gNB CBSD base stations. Each of the base stations (102, 104, 106, 108, 110, . . . , 112) has a corresponding wireless coverage area for user equipment (UE) devices, represented by circles (102, 104, 106, 108, 110, . . . , 112), respectively. The exemplary communications system 100 further includes a plurality of user equipment (UE) devices (UE 1 118, UE 2 120, UE 3 122, UE 4 124, UE 5 126, UE 6 128, UE 7 130, UE 8 132, UE 9 134, . . . , UE M 138). At least some of the UEs are mobile devices which have move throughout the system 100 and be coupled to different base stations at different times.

UE 1 118, UE 2 120 and UE 3 122 are coupled to base station 1 102 via wireless communications links (119, 121, and 123), respectively. UE 4 124 and UE 5 126 are coupled to base station 2 104 via wireless communications links (125 and 127), respectively. UE 6 128 and UE 7 130 are coupled to base station 3 106 via wireless communications links (129 and 131), respectively. UE 8 132 and UE 9 134 are coupled to base station 4 108 via wireless communications links (133 and 135), respectively. UE 10 136 and UE M 138 are coupled to base station N 110 via wireless communications links (137 and 139), respectively.

Exemplary communications system 100 further includes a first service provider core network 112 including an access and mobility function (AMF) element 114 and a user plane function (UPF) element 116. Exemplary communications system 100 further includes an untrusted third party network and/or Internet 140 including routers 142, 144.

Base station 1 102 has an untrusted link/path 146 to core network 112 including: i) a first portion 146a of the path 146 between base station 1 102 and the router 142 and ii) a second portion 146b of the path 146 between router 142 and the core network 112. Because the backhaul path 146 is an untrusted path, e.g., due to traversing the untrusted third party network 140, IPSec is used for communications over backhaul path 146. Base station 2 104 has a trusted link/path 148 to core network 112, and normal IP is used for communications over the trusted backhaul path 150. Base station 3 106 has an untrusted link/path 150 to core network 112 including: i) a first portion 150a of the path 150 between base station 3 106 and the router 144 and ii) a second portion 150b of the path 150 between router 144 and the core network 112. Because the backhaul path 150 is an untrusted path, e.g., due to traversing the untrusted third party network 140, IPSec is used for communications over backhaul path 150. Base station 4 108 has a trusted link/path 152 to core network 112, and normal IP is used for communications over the trusted backhaul path 152. Base station N 108 has a trusted link/path 154 to core network 112, and normal IP is used for communications over the trusted backhaul path 154.

A base station which does not have a trusted link/path to core network 112 may, and sometimes, does establish and use an alternative backhaul path to core network 112 to reduce transmission latency, in accordance with various embodiments of the present invention. In the example of FIG. 1, base station 1 102 has established wireless connection 156 with base station 2 104, and base station 2 104 is operating in a shared backhaul mode of operation. Thus base station 1 102 has established and uses for its traffic an alternative backhaul path including: i) first path portion wireless connection 156 and ii) second path portion trusted link path 148. The data transmission latency from base station 1 102 to core network 112 is smaller for this alternative backhaul path than if the untrusted path 146 was used.

Figure 2:
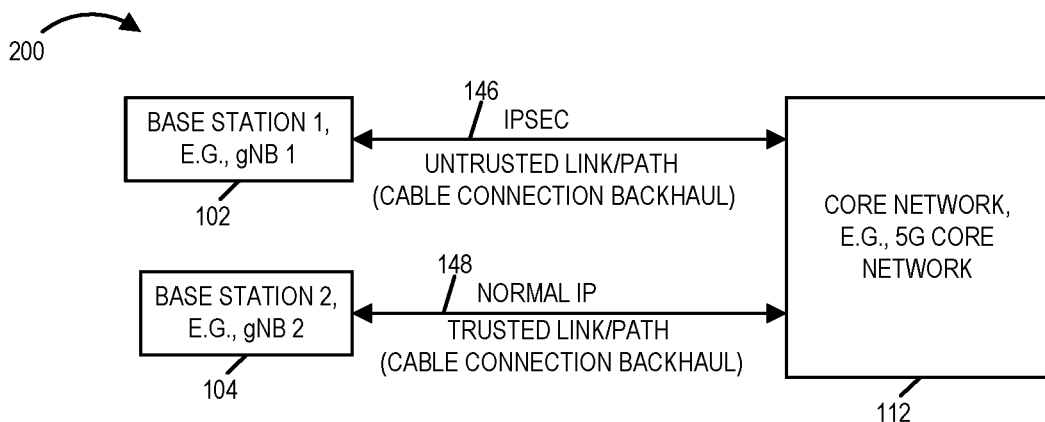
FIG. 2 is a drawing illustrating a first base station, which has an untrusted link/path, e.g. cable connection backhaul, to its core network and thus use IPSec for communications over the untrusted link/path; and a second base station, which has a trusted link/path, e.g. cable connection backhaul, to its core network and uses normal IP for communications over the trusted link/path.

FIG. 2 is a drawing 200 which illustrates that some base stations in a communications system may have an untrusted link/path, e.g. cable connection backhaul, to its core network and thus use IPSec for communications over the untrusted link/path, while other base stations in the communications system may have a trusted link/path, e.g. cable connection backhaul, to its core network and may use normal IP for communications over the trusted link/path. It should be appreciated that having to use IPSec instead or normal IP increases transmission delay and can, and sometimes, result in latency problems for a communications session. In the example of drawing 200 of FIG. 2, exemplary base station 1 102, e.g. gNB 1, has untrusted link/path 146 for its cable connection backhaul to core network 112, e.g., a 5G core network; and exemplary base station 2 104, e.g. gNB 2, has trusted link/path 148 for its cable connection backhaul to core network 112, e.g., a 5G core network.

Figure 3:
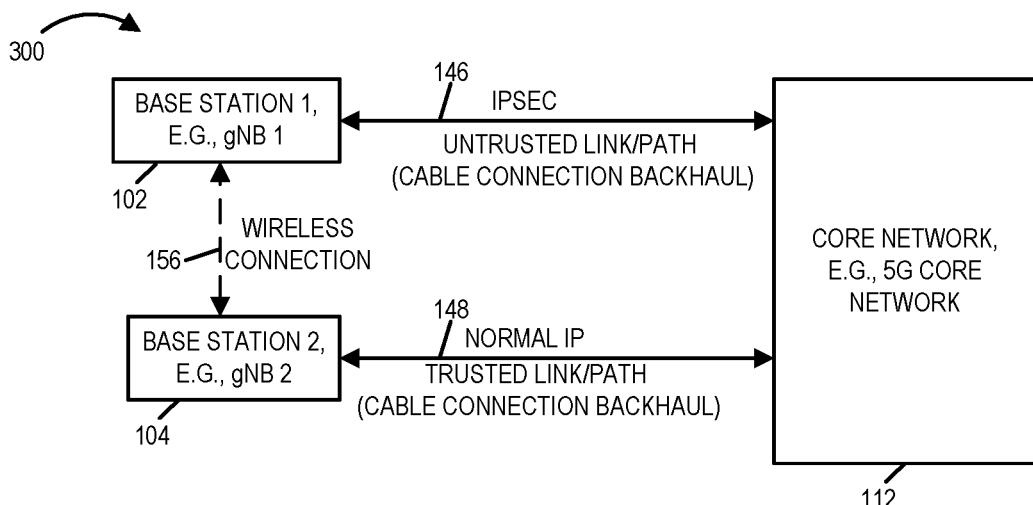
FIG. 3 is a drawing which illustrates an example, in accordance with an exemplary embodiment, in which a first base station, with an untrusted link/path for its backhaul to its core network, establishes a wireless connection with a second base station, with a trusted backhaul link/path, and the first station utilizes the second base station's backhaul to communicate its traffic to the core network.

FIG. 3 is a drawing 300 which illustrates an example, in accordance with an exemplary embodiment, in which a first base station with an untrusted link/path for its backhaul to its core network, establishes a wireless connection with a second base station, e.g. with a trusted backhaul link/path, in its vicinity and utilizes the second base station's backhaul to communicate its traffic to the core network. In the example of drawing 300 of FIG. 3, exemplary base station 1 102, e.g. gNB 1, has untrusted link/path 146 for its cable connection backhaul to core network 112, e.g., a 5G core network; and exemplary base station 2 104, e.g. gNB 2, has trusted link/path 148 for its cable connection backhaul to core network 112, e.g., a 5G core network. Base station 1 102 (operating as a UE with respect to base station 2 104) has established wireless connection 156 to base station 2 104. Base station 2 104, operating in shared backhaul mode, allows traffic (IP packets) received from base station 1 102 over wireless connection 156 to be sent, in encapsulated form, over its trusted backhaul link/path 148 along with its own traffic. Thus traffic is communicated from base station 1 102 to core network 112 using the path of wireless connection 156 and trusted link/path 148, faster than would be possible if untrusted link/path 146 had been used instead.

Figure 10:
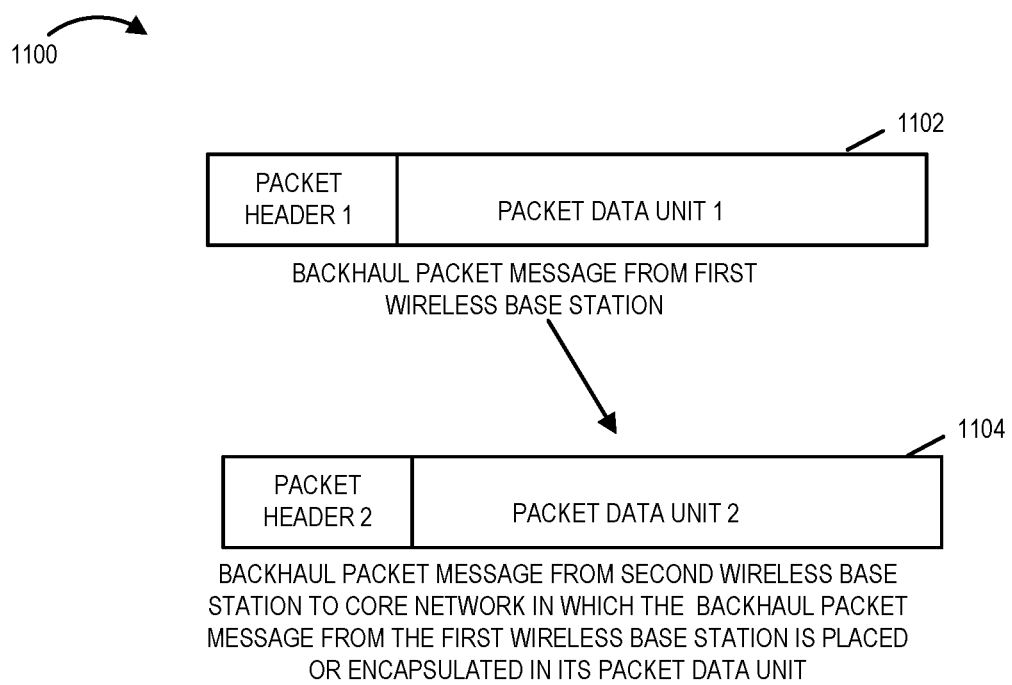
FIG. 10 is a drawing illustrating the encapsulation of a backhaul packet message from a first wireless base station into a backhaul packet message of a second wireless base station, the message being destined for the core network.

FIG. 10 is a drawing 100 illustrating the encapsulation of a backhaul packet message 1102 from a first wireless base station into a backhaul packet message 1104 of a second wireless base station. The backhaul packet messages being destined for the core network. The backhaul packet message 1102 includes a packet header 1 and a packet data unit 1. The backhaul packet message 1104 includes a packet header 2 and a packet data unit 2. The backhaul packet message 1102 is encapsulated in the packet data unit 2 of backhaul packet message 1102.

Figure 4:
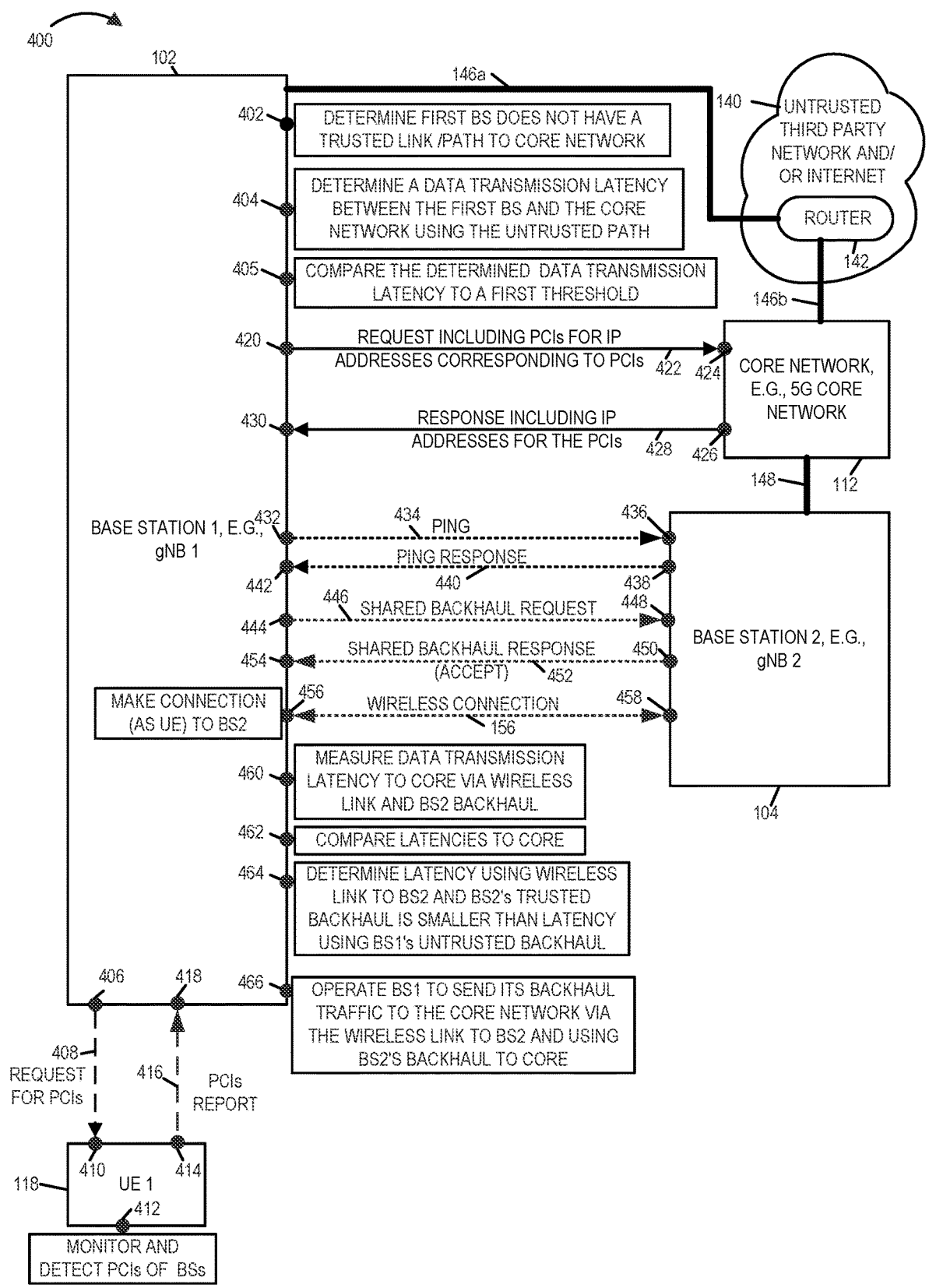
FIG. 4 is a drawing illustrating elements of the exemplary system of FIG. 1, exemplary steps preformed in accordance with an exemplary communications method, and exemplary signaling between various elements, in accordance with an exemplary embodiment.

FIG. 4 is a drawing 400 illustrating elements (base station 1 102, base station 2 104, core network 112, UE 1 118, router 142 of untrusted third party network 140, untrusted link/path portion 146a, untrusted link/path portion 146b, and trusted link/path portion 148) of system 100 of FIG. 1, exemplary steps preformed in accordance with an exemplary communications method and exemplary signaling between various elements, in accordance with an exemplary embodiment.

In step 402 base station 1 102 determines that it does not have a trusted link/path to core network 112. In some embodiments, base station 1 102 detects that it does not have a trusted/path to core network 112 in response to receiving an IPSec connection request from core network 112. In step 404 the base station 1 102 determines a data transmission latency between itself and the core network 112 using the untrusted path 146, which includes untrusted path portion 146a, router 142 and untrusted path portion 146b. In some embodiments base station 1 102 measures a round trip time (RTT) along the untrusted path, e.g. sends a signal to the core network 112, monitors for and detects when the response arrives to determine RTT, and then determines the data transmission latency to be ½ the measured RTT. In step 405, the base station 1 102 compares the determined data transmission latency to a first threshold. If the comparison of step 405 determines that the determined data transmission latency is not greater than the first threshold, then the base station 1 102 uses the untrusted path 146 that it has to the core network 112 to send backhaul traffic to core network 112. However, if the comparison of step 405 determines that the determined data transmission latency is greater than the first threshold, then base station 1 102 decides to search for an alternative path to core network 112 with lower latency and operation proceeds from step 405 to step 408.

In step 408 base station 1 102 generates and sends a request 408 for PCIs to one or more UEs, said one or more UE including UE 1 118. In step 410 UE 1 118 receives the request for PCIs. In step 412 UE 1 118 monitors and detects PCIs of base stations in its vicinity. In step 414 UE 1 118 generated and sends a report 416 of detected PCIs to base station 1 102. In step 418 base station 1 102 receives the report 416 of detected PCIs from UE 1 118. Base station 1 102 may also receive PCI reports from other UEs. In step 420 base station 1 102 generates a list of PCIs of other base stations in its vicinity (other than itself), from PCI report 416 and optionally PCI reports from other UEs, e.g. UE 2 120 and UE 3 122. In the example of FIG. 4, the generated list of PCIs includes at least the PCI corresponding to base station 2 104. In step 420, base station 1 102 further generates and sends to core network 424 a request 422 for IP addresses corresponding to PCIs, said request including said generated list of PCIs. In some embodiments, the request 422 is sent to AMF device 114 within core network 112. In step 426, the core network 112, e.g. the AMF device 114 in core network 112, obtains the IP address for each base station corresponding to the received list of PCIs, generates a response message 428 including the IP addresses for the PCIs, and sends the response message 428 to base station 1 102. In step 430, base station 1 102 receives the response message 428 and recovers the communicated IP addresses corresponding to base stations in its vicinity.

Base station 1 102, using the received IP addresses sends a ping to one or more or all of the base stations for which an IP address was provided and monitors for a response from each base station to which it sent a ping. A base station may decide not to respond to a ping if it does not have available resources and/or is overloaded. In this example, in step 432 base station 1 102 generates and sends a ping 434 to base station 2 104. In step 436, base station 2 104 receives the ping. In step 438 base station 2 104 decides that it currently has available resources and is not currently overloaded and thus responds to the ping, generating and sending ping response 440 to base station 1. In step 442 base station 1 102 receives the ping response and determines that base station 2 104 is a potential candidate to operate in shared backhaul mode.

In step 444 base station 1 102 generates and sends a shared backhaul request message 446 to base station 2 104 requesting base station 2 104 to operate in a shared backhaul mode of operation. In step 448, base station 2 104 receives the shared backhaul request message 446. In step 450 base station 2 104 decides to accept the shared backhaul request, generates a shared backhaul response message 452 including an indication of accept, and sends the generated response message 452 to the first base station. In step 454 the first base station 102 receives the shared backhaul response 452 indicating acceptance.

In step 456 base station 1 456 makes a connection (as UE) to base station 2 104, and in step 458 base station 2 104 completes the connection. Thus wireless connection 156 is established between base station 1 102 and base station 2 104.

In step 460 base station 1 102 measures the data transmission latency to core 112 via wireless link 156 and base station 2's trusted backhaul link/path 148. In some embodiments base station 1 102 measures a round trip time (RTT) along the path including wireless link 156 and trusted link/path 148 by sends a signal to the core network 112 along that path, monitoring for and detecting when the response arrives to determine a RTT, and then determining the data transmission latency to be ½ the measured RTT.

In step 462 base station 1 102 compares the data transmission latency, via wireless link 156 and trusted BS 2 backhaul 148, which was determined in step 460, to the data transmission latency, via untrusted path, including path portion 146a, router 142 and path portion 146b, which was determined in step 404. In step 464 the base station 1 102 determines that the data transmission latency using wireless link 156 and base station 2's trusted backhaul 148 is smaller than the latency using base station 1's untrusted backhaul. Thus, in step 466, in response to the determination of step 464, base station 1 102 determines to send its backhaul traffic to the core network via the path including wireless link 156 and using base station 2's backhaul, with base station 2 104 operating in shared backhaul mode.

Figure 5:
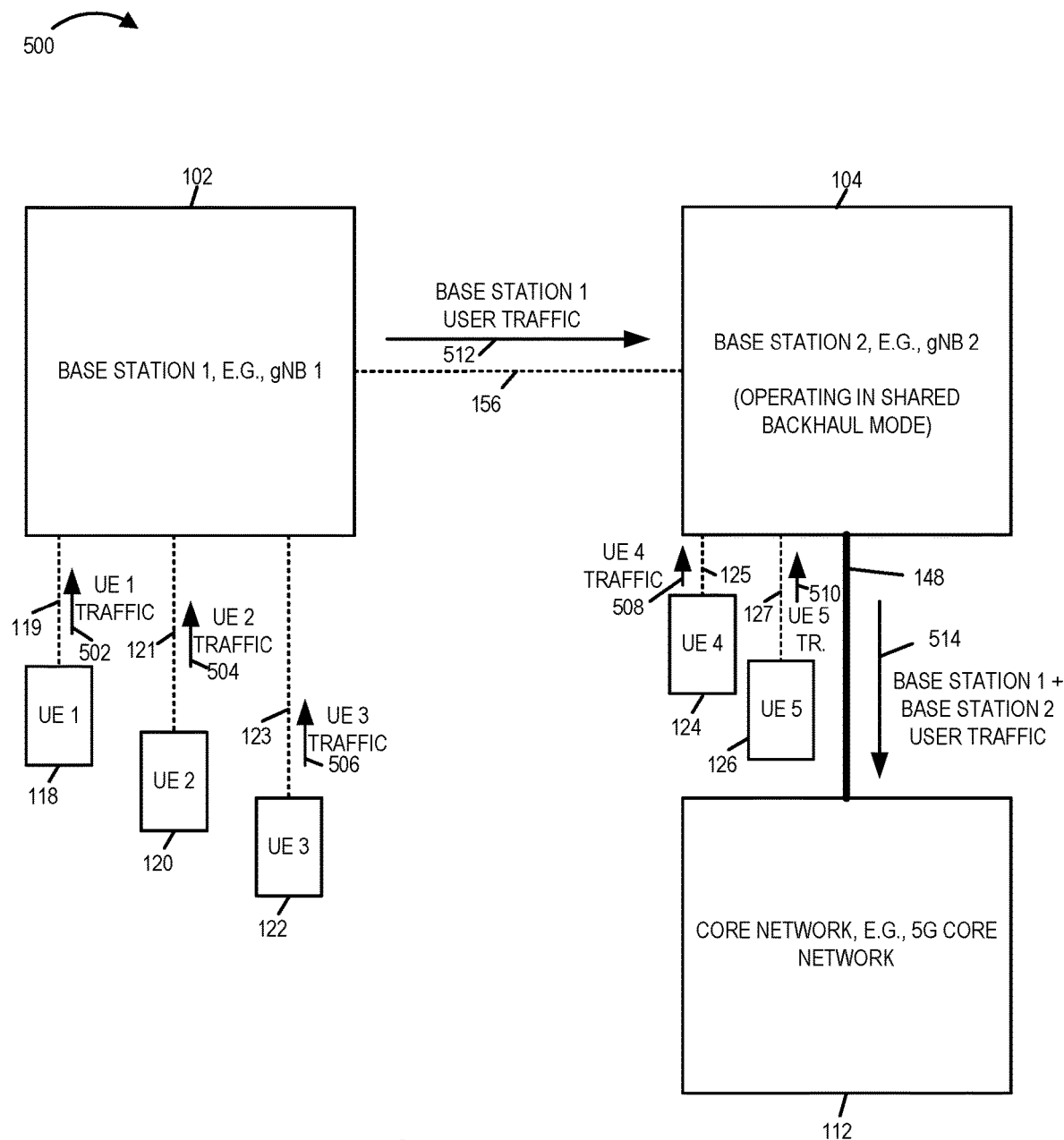
FIG. 5, which is a continuation of the example of FIG. 4, illustrates exemplary traffic being routed to the core network from the first base station and second base station 2, while the second base station is operating in shared backhaul mode of operation, in accordance with an exemplary embodiment.
Figure 6A:
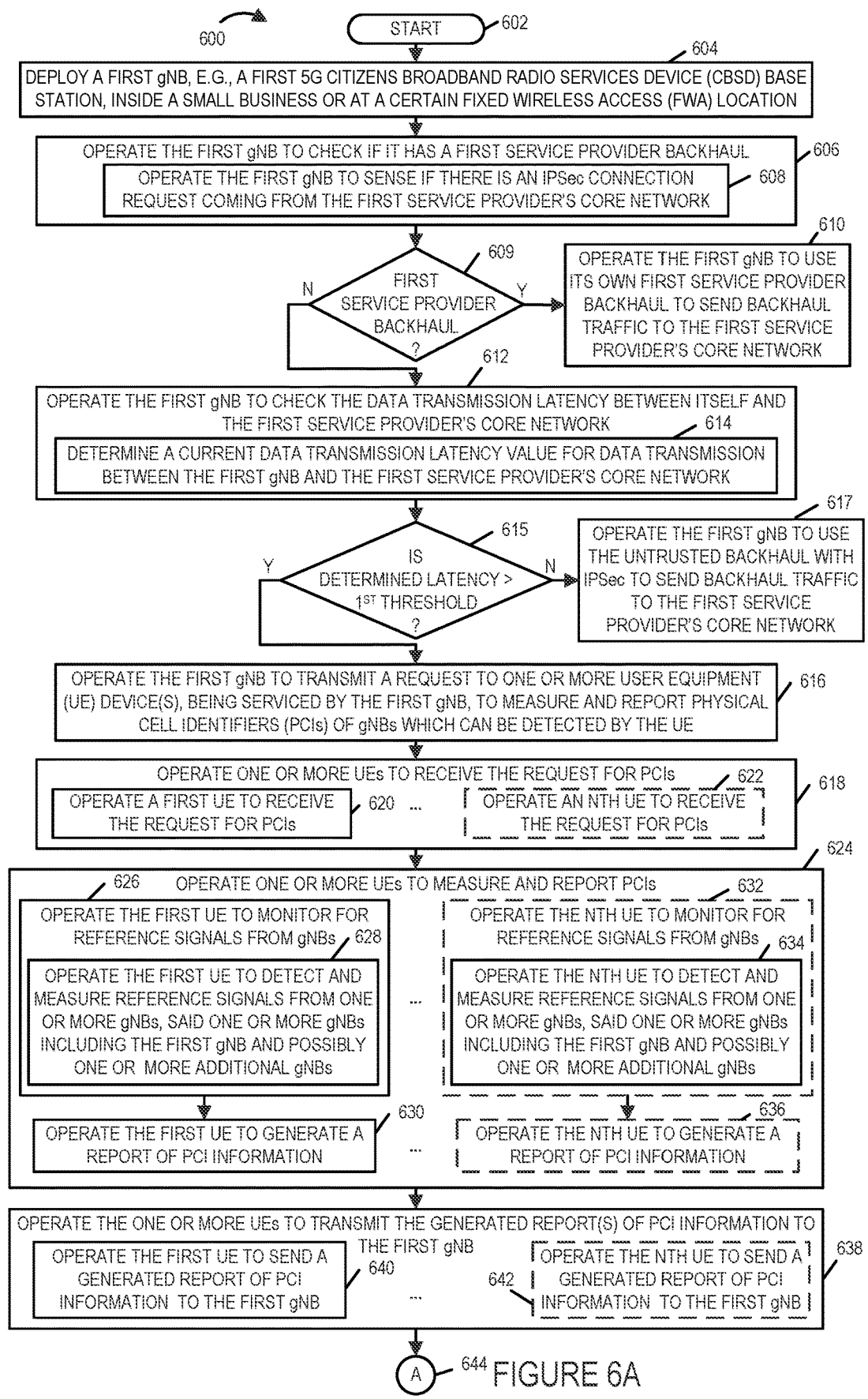
FIG. 6A is a first part of a flowchart of an exemplary communications method in accordance with an exemplary embodiment.
Figure 6B:
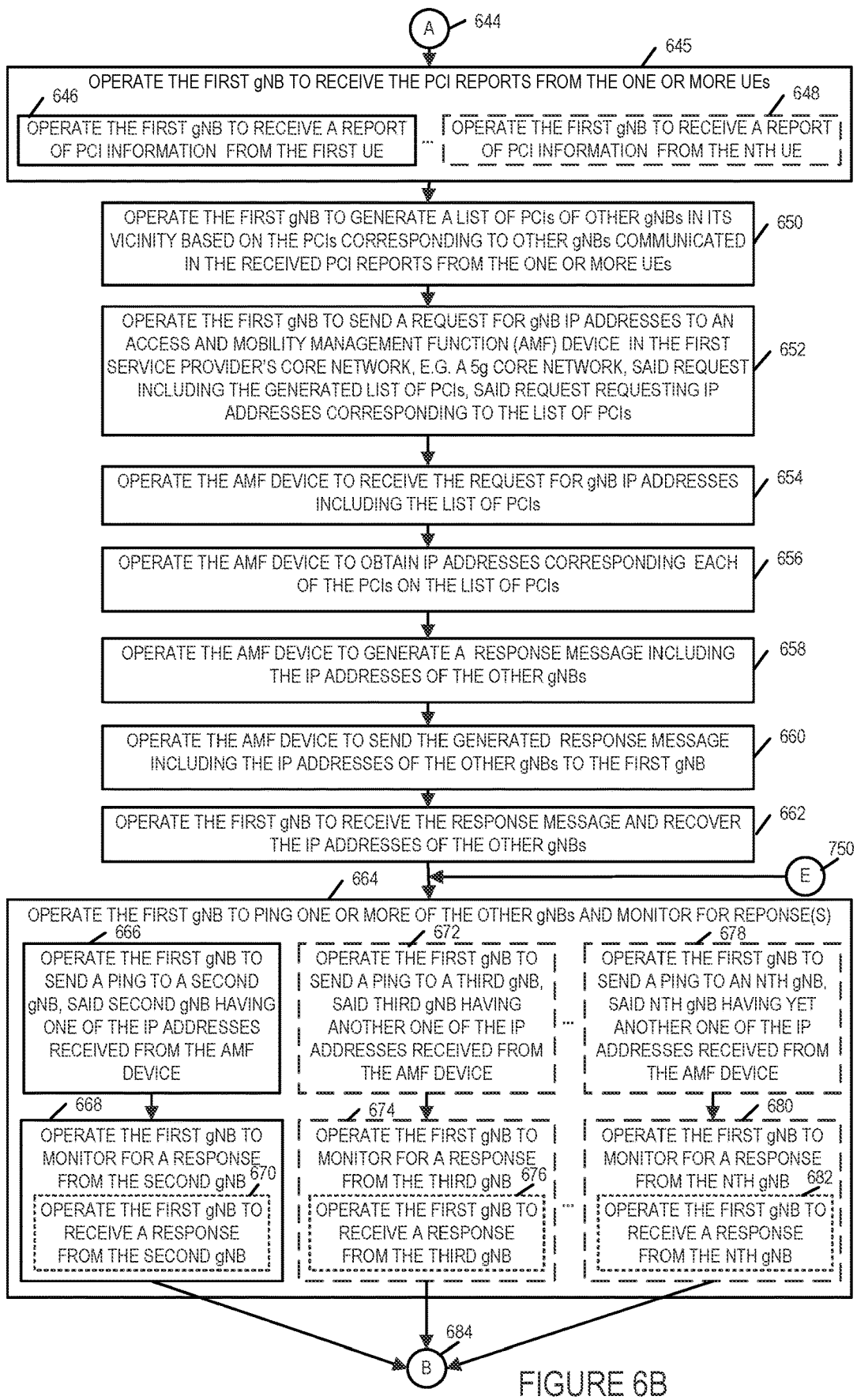
FIG. 6B is a second part of a flowchart of an exemplary communications method in accordance with an exemplary embodiment.
Figure 6C:
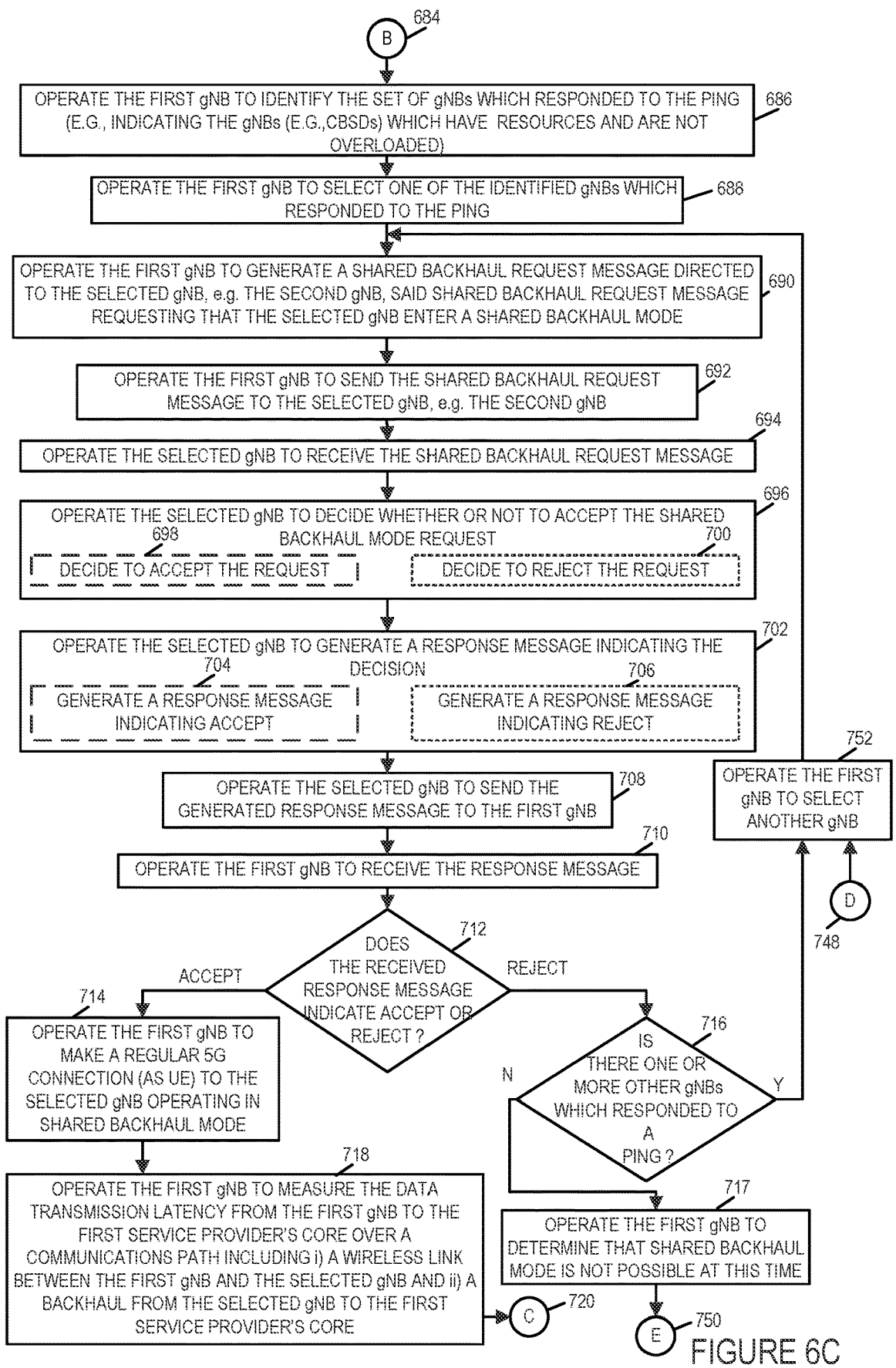
FIG. 6C is a third part of a flowchart of an exemplary communications method in accordance with an exemplary embodiment.
Figure 6D:
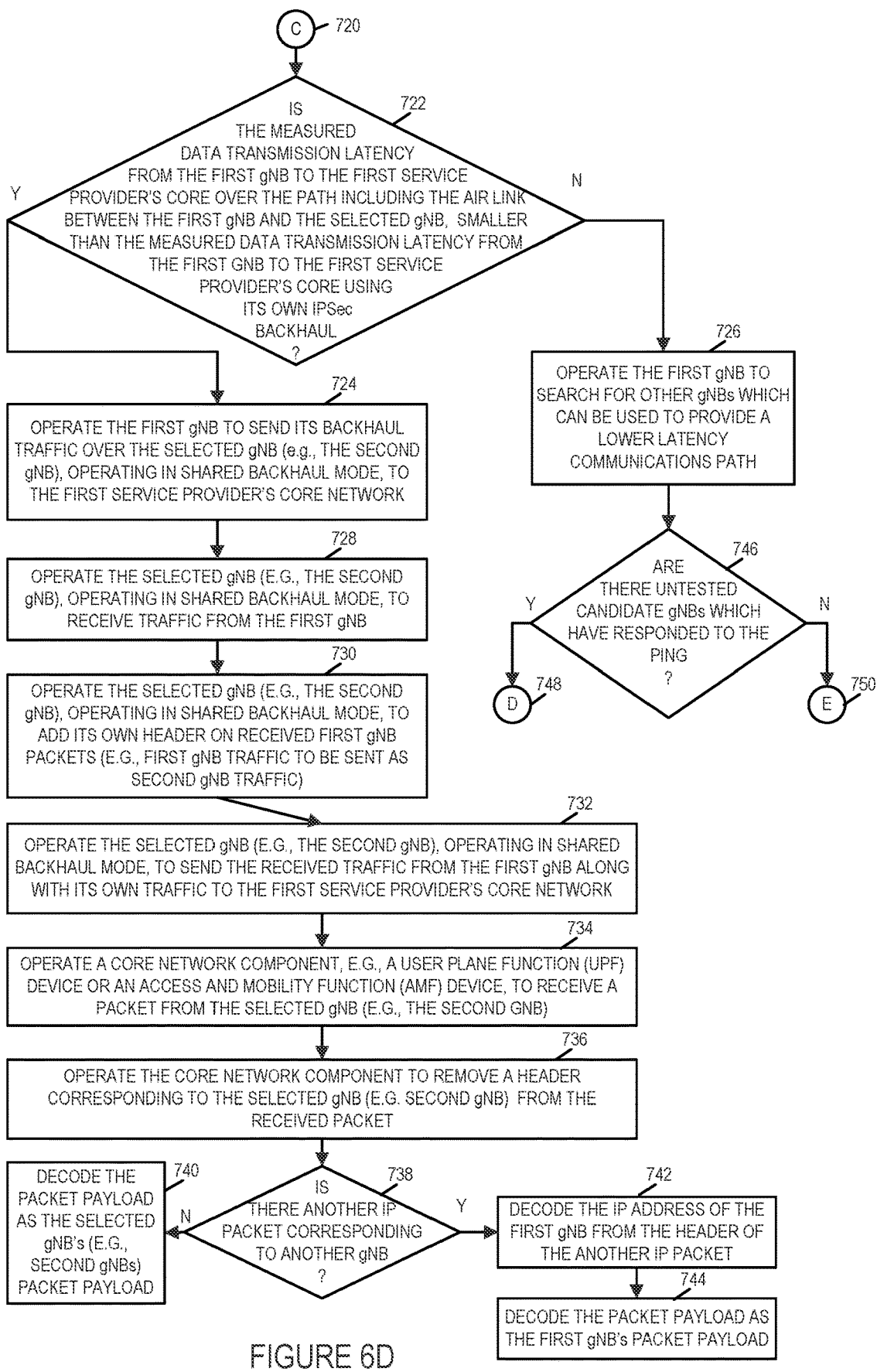
FIG. 6D is a fourth part of a flowchart of an exemplary communications method in accordance with an exemplary embodiment.

FIG. 5, which is a continuation of the example of FIG. 4, is a drawing 500 illustrating exemplary traffic being routed to core network 112 from base station 1 102 and base station 2 104, while base station 2 104 is operating in shared backhaul mode of operation.

UEs (UE 1 118, UE 2 120, UE 3 122) generate and send traffic (UE 1 traffic 502, UE 2 traffic 504, UE 3 traffic 506), to base station 1 102, via wireless links (119, 121, 123), respectively. UEs (UE 4 124, UE 5 126) generate and send traffic (UE 4 traffic 508, UE 5 traffic 510), to base station 2 102, via wireless links (125, 127), respectively.

Base station 1 102 generates and sends base station 1 user traffic 512 via wireless connection 156 to base station 2 104. Base station 2 103 encapsulates IP packets received from base station 1, adding a header including the IP address of base station 2. Base station 2 104 generates and sends signals 514 including base station 1+base station 2 user traffic over its trusted backhaul link/oath 148 to core network 112, e.g., to the AMF element 114 or to the UPF element 116 in the core network 112.

FIG. 6, comprising the combination of FIG. 6A, FIG. 6B, FIG. 6C and FIG. 6D, is a flowchart 600 of an exemplary communications method in accordance with an exemplary embodiment. Operation starts in step 602 in which an exemplary communications system is powered on and initialized. Operation proceeds from start step 602 to step 604. In step 604 a first gNB, e.g., a first 5G Citizens broadband radio services device (CBSD) base station, is deployed inside a small business or at a certain fixed wireless access (FWA) location. Operation proceeds from step 604 to step 606.

In step 606 the first gNB is operated to check if it has a first service provider backhaul, e.g., a trusted link/path to first service provider's core network. Step 606 includes step 608, in which the first gNB is operated to sense if there is an IPSec connection request coming from the first service provider's core network. If the first gNB senses that there is an IPSec connection request coming from the first service provider's core network, then the first gNB determines that it does not have a first service provider backhaul, e.g., a trusted link/path does not exist between the first gNB and the first service provider core network; therefore, an untrusted link/path including a third party network can be used, and IPSec is to be used for communications. However, if the first gNB determines that it has a first service provider backhaul, e.g., a trusted link/path exists between the first gNB and the first service provider core network, normal IP can be used. The use of IPSec adds latency to communications. Operation proceeds from step 606 to step 609.

In step 609, if the first gNB has determined that it has a first service provider backhaul, e.g. the first gNB has a trusted link/path to the first service provider's core, then operation proceeds from step 608 to step 610, in which the first gNB is operated to use its own first service provider backhaul, e.g., a trusted link/path, to send backhaul traffic to the first service provider's core network, e.g., communicating normal IP packets over the trusted link/path.

Alternatively, in step 609, if the first gNB has determined that it does not have a first service provider backhaul, then operation proceeds from step 609 to step 612, in which the first gNB is operated to check the data transmission latency between itself and the first service provider's core network. Step 612 includes step 614, in which the first gNB determines a current data transmission latency value for data transmission between the first gNB and the first service provider's core network, e.g. the gNB sends a signal to an element in the first service provider's core, receives a response, measures a round-trip-time (RTT) and determines the transmission latency value to be ½ the measured RTT. Operation proceeds from step 612 to step 615.

In step 615 the first gNB compares the determined data transmission latency of step 614 to a first threshold. If the determined data transmission latency of step 614 is not greater than the first threshold, then operation proceeds from step 615 to step 617, in which the first gNB uses the untrusted backhaul with IPSec to send backhaul traffic to the first service provider's core network. However, if the determined data transmission latency of step 614 is greater than the first threshold, then operation proceeds from step 615 to step 616.

In step 616 the first gNB is operated to transmit a request to one ore more user equipment (UE) devices, being serviced by the first gNB, to measure and report physical cell identifiers (PCIs) of gNBs which can be detected by the UE. Operation proceeds from step 616 to step 618.

In step 618 one or more UEs are operated to receive the request for PCIs. Step 618 includes step 618 in which a first UE is operated to receive the request for PCIs. In some embodiments, step 618 includes step 622 in which an Nth UE is operated to receive the request for PCIs. Operation proceeds from step 618 to step 624.

In step 624 one or more UEs are operated to measure and report PCIs. Step 624 includes steps 626, 628 and 630. In step 626 the first UE is operated to monitor for reference signals from gNBs. Step 626 includes step 628 in which the first UE is operated to detect and measure reference signals from one or more gNBs, said one or more gNBs including the first gNB and possibly one or more additional gNBs. Operation proceeds from step 626 to step 630. In step 630 the first UE is operated to generate a report of PCI information, e.g. a report indicating detected PCIs corresponding to base stations in its vicinity from which it was able to receive signals above a predetermined threshold.

Step 624 may, and sometimes does, further include steps 632, 634 and 636. In step 632 the Nth UE is operated to monitor for reference signals from gNBs. Step 632 includes step 634 in which the Nth UE is operated to detect and measure reference signals from one or more gNBs, said one or more gNBs including the first gNB and possibly one or more additional gNBs. Operation proceeds from step 632 to step 636. In step 636 the Nth UE is operated to generate a report of PCI information, e.g. a report indicating detected PCIs corresponding to base stations in its vicinity from which it was able to receive signals above a predetermined threshold. Operation proceeds from step 624 to step 638.

In step 638 the one or more UEs are operated to transmit the generated report(s) of PCI information to the first gNB. Step 638 includes step 640, in which the first UE is operated to send a generated report of PCI information to the first gNB. Step 638 may, and sometimes does, include step 642, in which the Nth UE is operated to send a generated report of PCI information to the first gNB. Operation proceeds from step 638, via connecting node A 644, to step 645.

In step 645 the first gNB is operated to receive the PCI report(s) from the one or more UE devices. Step 645 includes step 646, in which the first gNB receives a report of PCI information from the first UE device. Step 645 may, and sometimes does, includes step 648 in which the first gNB receives a report of PCI information from the Nth UE device. Operation proceeds from step 645 to step 650.

In step 650 the first gNB generates a list of PCIs of the gNBs in its vicinity based on the PCIs corresponding to other gnBs communicated in the received PCI reports from the one or more UEs, e.g. the first gNB generates the list of PCIs in its vicinity by aggregating information received from multiple UEs. Operation proceeds from step 650 to step 652.

In step 652 the first gNB is operated to send a request for gNB addresses to an access and mobility management function (AMF) device in the first service provider's core network, e.g., a 5G core network, said request including the generated list of PCIS, said request requesting IP addresses corresponding to the list of PCIs. Operation proceeds from step 652 to step 654.

In step 654 the AMF device receives the request for gNB IP addresses including the list of PCIs. Operation proceeds from step 654 to step 656.

In step 656 the AMF device obtains IP addresses corresponding to each of the PCIs on the list of PCIs. Operation proceeds from step 656 to step 658.

In step 658 the AMF device generates a response message including the IP addresses of the other gNBs. Operation proceeds from step 658 to step 660.

In step 660 the AMF device is operated to send the generated response message including the IP addresses of other gNBs to the first gNB. Operation proceeds from step 660 to step 662.

In step 662 the first gNB is operated to receive the response message and recover the IP addresses of the other gNBs. Operation proceeds from step 662 to step 664.

In step 664 the first gNB is operated to ping one or more of the other gNB and monitor for responses. Step 664 includes step 666 and step 668. In step 666 the first gNB is operated to send a ping to a second gNB, said second gNB having one of the IP addresses received from the AMF device in the received response message. Operation proceeds from step 666 to step 668. In step 668 the first gNB is operated to monitor for a response from the second gNB. Step 668 may, and sometimes does, include step 670, in which the first gNB is receives a response from the second gNB.

Step 664 may, and sometimes does, further include step 672 and step 674. In step 672 the first gNB is operated to send a ping to a third gNB, said third gNB having one of the IP addresses received from the AMF device in the received response message. Operation proceeds from step 672 to step 674. In step 674 the first gNB is operated to monitor for a response from the third gNB. Step 674 may, and sometimes does, include step 676, in which the first gNB receives a response from the third gNB.

Step 664 may, and sometimes does, further include step 678 and step 680. In step 678 the first gNB is operated to send a ping to an Nth gNB, said Nth gNB having one of the IP addresses received from the AMF device in the received response message. Operation proceeds from step 678 to step 680. In step 680 the first gNB is operated to monitor for a response from the Nth gNB. Step 680 may, and sometimes does, include step 682, in which the first gNB receives a response from the Nth gNB. Operation proceeds from step 664, via connecting node B 684, to step 686.

In step 686 the first gNB is operated to identify the set of gNBs which responded to a ping, e.g., indicating the gNBs, e.g., CBSD, which have resources and are not overloaded. Operation proceeds from step 686 to step 688. In step 1088 the first gNB selects one of the identified gNBs which has responded to a ping. Operation proceeds from step 688 to step 690.

In step 690 the first gNB is operated to generate a shared backhaul request message directed to the selected gNB, e.g. the second gNB, said shared backhaul request message requesting that the selected gNB enter a share backhaul mode. Operation proceeds from step 690 to step 692.

In step 692 the first gNB is operated to send the generated shared backhaul request message to the selected gNB, e.g., the second gNB. Operation proceeds from step 692 to step 694.

In step 694 the selected gNB is operated to receive the shared backhaul request message. Operation proceeds from step 694 to step 696. In step 696 the selected gNB decides whether or not to accept the shared backhaul mode request. Each iteration of step 696 includes one of step 698 or step 700. In step 698 the selected gNB decides to accept the request. In step 700 the selected gNB decides to reject the request. Operation proceeds from step 696 to step 702.

In step 702 the selected gNB generates a response message indicating the decision of step 696. Each iteration of step 702 includes one or step 704 or step 706. In step 704 the selected gNB generates a response message indicating accept. In step 706 the selected gNB generates a response message indicating reject. Operation proceeds from step 702 to step 708.

In step 708 the selected gNB sends the generated response message to the first gNB. Operation proceeds from step 708 to step 710. In step 710 the first gNB is operated to receive the response message. Operation proceeds from step 710 to step 712.

In step 712 if the response message indicates accept then operation proceeds from step 712 to step 714; however, if the responses message indicates reject then operation proceeds from step 712 to step 716. Returning to step 714, in step 714, the first gNB is operated to make a regular 5G connection (as UE) to the selected gNB, operating in shared backhaul mode. Operation proceeds from step 714 to step 716. In step 716 the first UE is operated to measure the data transmission latency from the first gNB to first service provider's core over a communications path including: i) a wireless link between the first gNB and selected gNB and ii) a backhaul from the selected gNB to the first service provider's core, e.g. a RTT time is measured and divided by two to obtain a data transmission latency. Operation proceeds from step 718, via connecting node C 720 to step 722.

In step 722 the first gNB determines if the measured data transmission latency from the first gNB to the first service provider's core over the path including the air link between the first gNB to selected gNB (obtained from step 718) is smaller than the measured data transmission latency from the first gNB to the first service provider's core using it own IPSec backhaul (obtained from step 614). If the measured data transmission latency from the first gNB to the first service provider's core over the path including the air link between the first gNB to selected gNB is smaller than the measured data transmission latency from the first gNB to the first service provider's core using it own IPSec backhaul, then operation proceeds from step 722 to 724; otherwise, operation proceeds from step 722 to step 726.

Returning to step 724, in step 724 the first gNB is operated to send its backhaul traffic over the selected gNB, e.g., the second gNB, operating in shared backhaul mode, to the first service provider's core network. Thus in step 724, the first gNB is operated to transmit its backhaul traffic, e.g. IP packets of its backhaul traffic, to the selected gNB, e.g., the second gNB, via a wireless communications link between the first gNB and the selected gNB, with the understanding that the selected gNB will send the received IP packets to the first service provider's core, via its backhaul to the first service provider's core. Operation proceeds from step 724 to step 728.

In step 728 the selected gNB, e.g. the second gNB, operating in shared backhaul mode, is operated to receive traffic communicated in wireless signals from the first gNB. Operation proceeds from step 728 to step 730.

In step 730 the selected gNB, e.g., the second gNB, operating is shared backhaul mode, is operated to add its own header on the received first gNB packets. Thus, first gNB traffic is to be sent as second gNB traffic. Operation proceeds from step 730 to step 732.

In step 732 the selected gNB, e.g., the second gNB, operating in shared backhaul mode, is operated to send the received traffic from the first gNB, which has been encapsulated, along with its own traffic to the first service provider's core network. Operation proceeds from step 732 to step 734.

In step 734 a core network component, e.g. a user plane function (UPF) device or an access and mobility function (AMF) device, is operated to receive a packet from the selected gNB, e.g., the second gNB. Operation proceeds from step 734 to step 736.

In step 736 the core network component is operated to remove a header corresponding to the selected gNB, e.g. the second gNB, from the received packet to obtain a packet payload. Operation proceeds from step 736 to step 738.

In step 738 the core network component determines if there is another IP packet corresponding to another gNB in the packet payload output from step 736. If the determination is that there is not another IP packet corresponding to another gNB, then operation proceeds from step 738 to step 740, in which the core network component decodes the packet payload as the selected gNBs packet payload, e.g., the second gNBs packet payload. However, if the determination of step 738 is that there is another IP packet corresponding to another gNB, then operation proceeds from step 738 to step 742, in which the core network component decodes the IP address of the first gNB from the header of the another packet. Operation proceeds from step 742 to step 744 in which the core network component decodes the packet payload of the another IP packet as the first gNB's packet payload.

Returning to step 726, in step 726 the first gNB is operated to search for other gNBs which can be used to provide a lower latency communications path. Operation proceeds from step 726 to step 746. In step 746, the first gNB determines if there are untested candidate gNBs which have responded to the ping. If the determination of step 746 is that there are untested candidate gNBs which have responded to the ping, then operation proceeds from step 746, via connecting node D 748 to step 752. In step 752 the first gNB is operated to select another gNB from among the remaining untested gNBs which have responded to the ping. Operation proceeds from step 752 to step 690, in which the first gNB generates another shared backhaul request message directed to the newly selected gNB.

Alternatively, if the determination of step 746 is that there are not any untested candidate gNBs which have responded to the ping, then operation proceeds, e.g., after a predetermined delay time, from step 746, via connecting node E 750 to step 664. In step 664 the first gNB is operated to ping one or more of the other gNB and monitor for responses.

Returning to step 716, in step 716 the first gNB determines if there are one or more other candidate gNBs which responded to the ping, but have not yet been requested to enter a shared backhaul mode. If the determination of step 716 is that there are one or more untested candidate gNBs which have responded to the ping, then operation proceeds from step 716 to step 752. In step 752 the first gNB is operated to select another gNB from among the remaining gNBs which have responded to the ping but have not yet been requested to operate in shared backhaul mode. Operation proceeds from step 752 to step 690, in which the first gNB generates another shared backhaul request message directed to the newly selected gNB.

Alternatively, if the determination of step 716 is that there are not any untested candidate gNBs which have responded to the ping, then operation proceeds from step 716 to step 717 in which the first gNB determines that shared backhaul mode is not possible at this time, since each of the candidate gNB has rejected the request. Operation proceeds, e.g., after a predetermined delay time, from step 717, via connecting node E 750 to step 664. In step 664 the first gNB is operated to ping one or more of the other gNB and monitor for responses.

Figure 7:
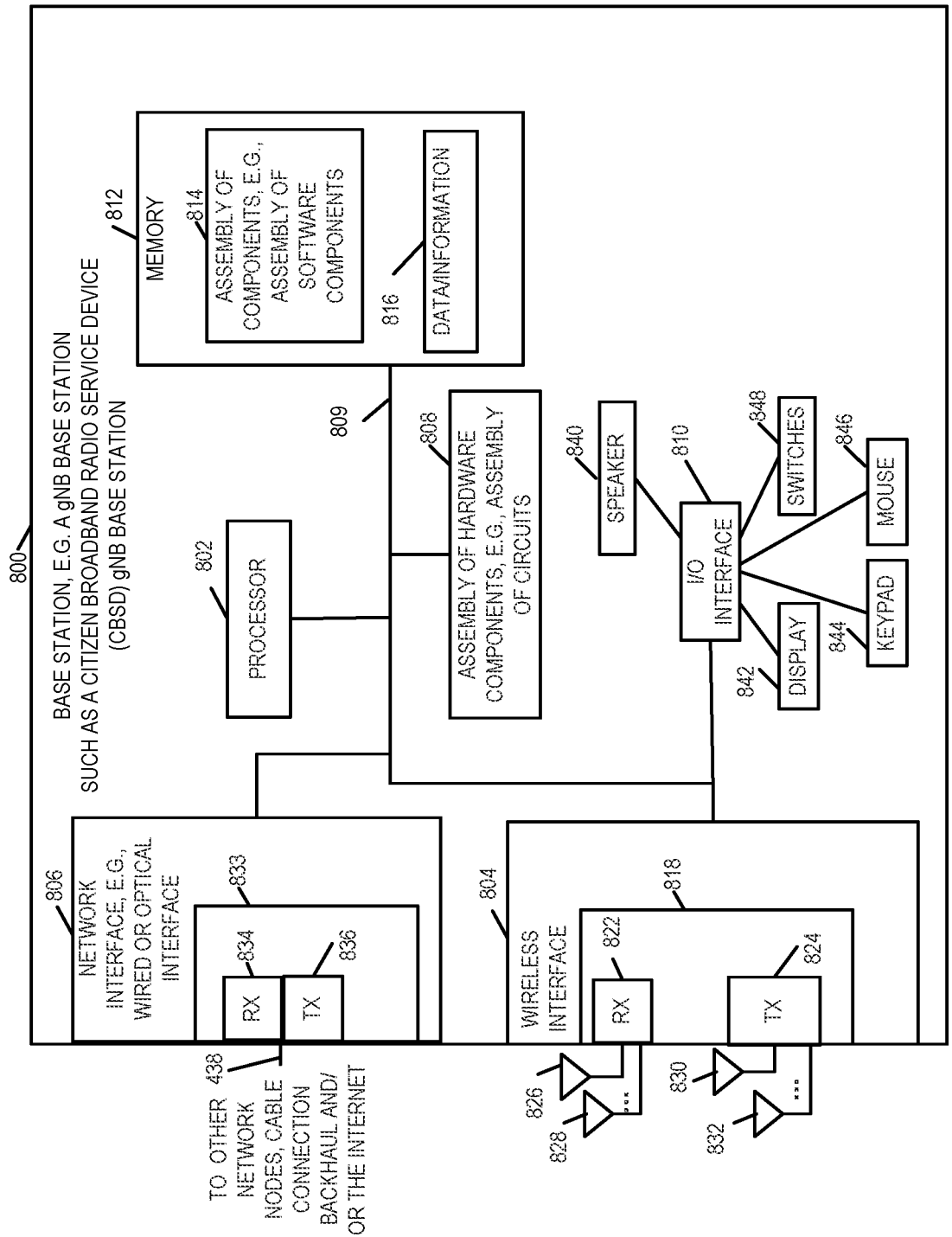
FIG. 7 is a drawing of an exemplary base station, e.g. a gNB base station such as a Citizens Broadband Radio Services Device (CBSD) gNB base station implemented in accordance with an exemplary embodiment.

FIG. 7 is a drawing of an exemplary base station 800, e.g. a gNB base station such as a Citizens Broadband Radio Services Device (CBSD) gNB base station implemented in accordance with an exemplary embodiment. Exemplary base station 800 is, e.g. any of the base stations (BS 1 102, BS 2 104, BS 3 106, BS 4 108, ..., BS N 110) of system 100 shown in or described with respect to FIGS. 1-5 and/or a base station implementing steps of the exemplary method of flowchart 600 of FIG. 6.

Exemplary base station 800 includes a processor 802, e.g., a CPU, a wireless interface 804, a network interface 806, an assembly of hardware components 808, e.g., an assembly of circuits, an I/O interface 810 and memory 812 coupled together via a bus 809 over which the various elements may interchange data and information. Base station 800 further includes a plurality of input/output devices (speaker 840, display 842, e.g., a touchscreen display, keypad 844, mouse 846, and switches 848) via which an operator may enter input, e.g. commands, controls, etc. and/or receive output, e.g., displays of status and results. The plurality of input/output devices (840, 842, 844, 946, 848) are coupled, via I/O interface 810 to bus 809, facilitating communication with other elements, e.g., interfaces 804,806, the processor 802, assembly of hardware components 808 and memory 812, within base station 800.

Wireless interface 804 includes a wireless receiver 822 and a wireless transmitter 824. In some embodiments, the wireless receiver and the wireless transmitter 824 are included as part of a transceiver 818. Wireless receiver 822 is coupled to one or more receive antennas (receive antenna 1 826, ..., receive antenna N 828), via which the base station 800 can receive wireless signals, e.g. wireless signals from UEs and wireless signals from other base stations. Wireless transmitter 824 is coupled to one or more transmit antennas (transmit antenna 1 830, ..., transmit antenna N 882), via which the base station 800 can transmit wireless signals, e.g. wireless signals to UEs and wireless signals from other base stations.

Network interface 806, e.g., a wired or optical interface includes a receiver 834 and a transmitter 836. In some embodiments, the receiver 834 and transmitter 836 are included as part of a transceiver 833. The receiver 834 and transmitter 836 are coupled to output connector 838 which couples the network interface 806 to other network nodes, a cable connection backhaul, and/or the Internet. For some base stations, the network interface 806 is coupled via a trusted link/path to its core network and regular IP can be used over that trusted path. For some base stations, the network interface 806 is coupled via an untrusted link/path backhaul to its core network and IPSec is to be used over that untrusted path.

Memory 812 includes an assembly of components 814, e.g., an assembly of software components, such as software routines, subroutines, modules and/or applications, and data/information 816.

Figure 8:
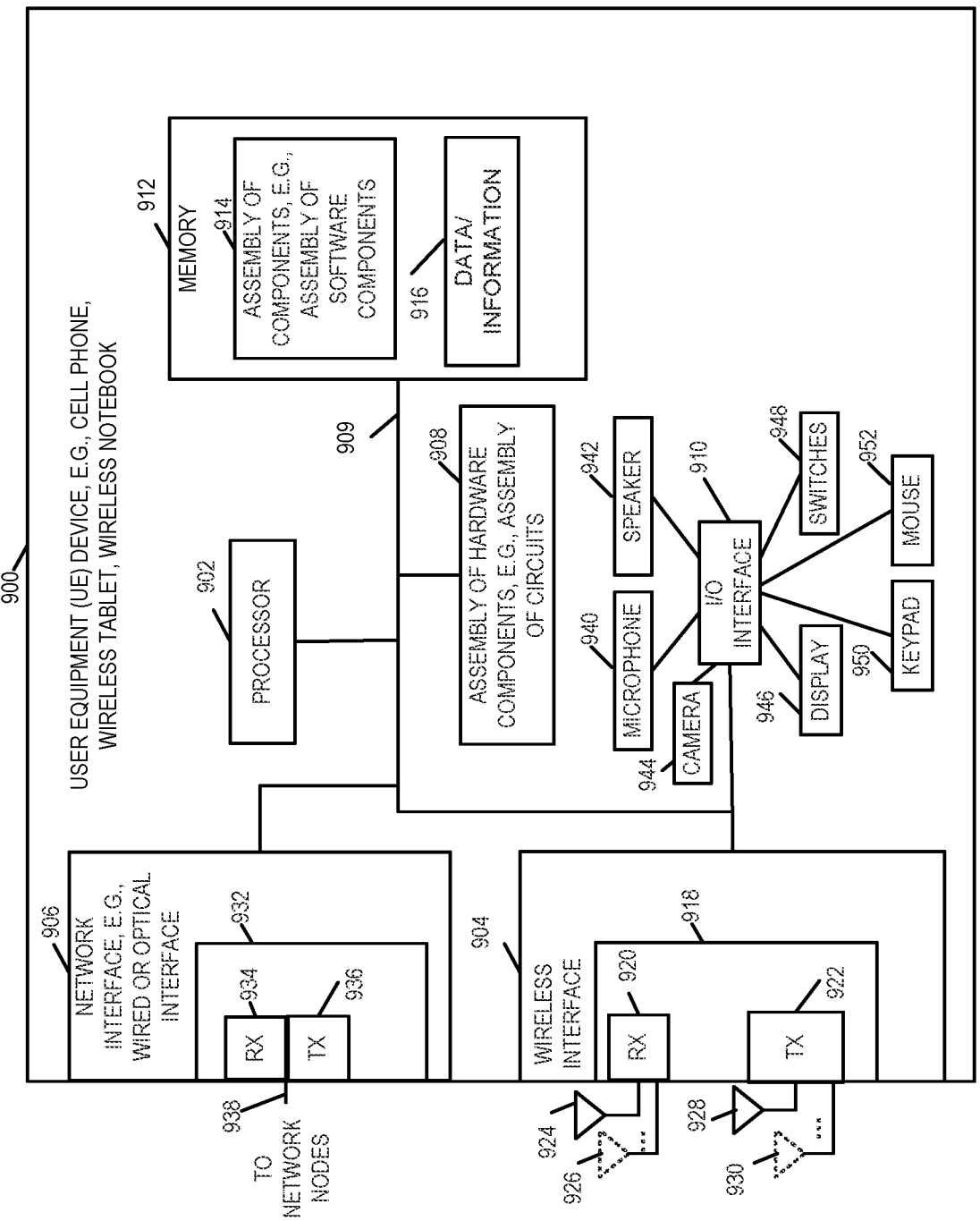
FIG. 8 is a drawing of an exemplary user equipment (UE) device, e.g., a cell phone, wireless table, or wireless notebook, implemented in accordance with an exemplary embodiment.

FIG. 8 is a drawing of an exemplary user equipment (UE) device 900, e.g. a cell phone, wireless table, or wireless notebook, implemented in accordance with an exemplary embodiment. Exemplary UE device 900 is, e.g. any of the UEs (UE 1 118, UE 2 120, UE 3 122, UE 4 124, UE 5 126, UE 6 128, UE 7 130, UE 8 132, UE 9 134, UE 10 136 ..., UE M 138) of system 100 shown in or described with respect to FIGS. 1-5 and/or a UE implementing steps of the exemplary method of flowchart 600 of FIG. 6.

Exemplary UE device 900 includes a processor 902, e.g., a CPU, a wireless interface 904, a network interface 906, an assembly of hardware components 908, e.g., an assembly of circuits, an I/O interface 910 and memory 912 coupled together via a bus 909 over which the various elements may interchange data and information. UE device 900 further includes a plurality of input/output devices (microphone 940, speaker 942, camera 944, display 946, e.g., a touchscreen display, keypad 950, mouse 952, and switches 948) via which an user of device 900 may enter input, e.g. data/information, selections, requests, commands, controls, etc. and/or receive output, e.g., displays of data/information, status and results. The plurality of input/output devices (940, 942, 944, 946, 948, 950, 952) are coupled, via I/O interface 910 to bus 909, facilitating communication with other elements, e.g., interfaces 904, 906, the processor 902, assembly of hardware components 908 and memory 912, within UE device 900.

Wireless interface 904 includes a wireless receiver 920 and a wireless transmitter 922. In some embodiments, the wireless receiver 920 and the wireless transmitter 922 are included as part of a transceiver 919. Wireless receiver 920 is coupled to one or more receive antennas (receive antenna 1 924, ..., receive antenna N 926), via which the UE 900 can receive wireless signals, e.g. wireless signals from UEs from other base stations. Wireless transmitter 922 is coupled to one or more transmit antennas (transmit antenna 1 928, ..., transmit antenna N 930), via which the UE device 900 can transmit wireless signals, e.g. wireless signals to base stations.

Network interface 906, e.g., a wired or optical interface includes a receiver 934 and a transmitter 936. In some embodiments, the receiver 934 and transmitter 936 are included as part of a transceiver 932. The receiver 934 and transmitter 936 are coupled to output connector 938 which can couples the network interface 906 to other devices, e.g. when the UE device is at a fixed location and attached to a wired or optical network.

Memory 912 includes an assembly of components 914, e.g., an assembly of software components, such as software routines, subroutines, modules and/or applications, and data/information 916.

Figure 9:
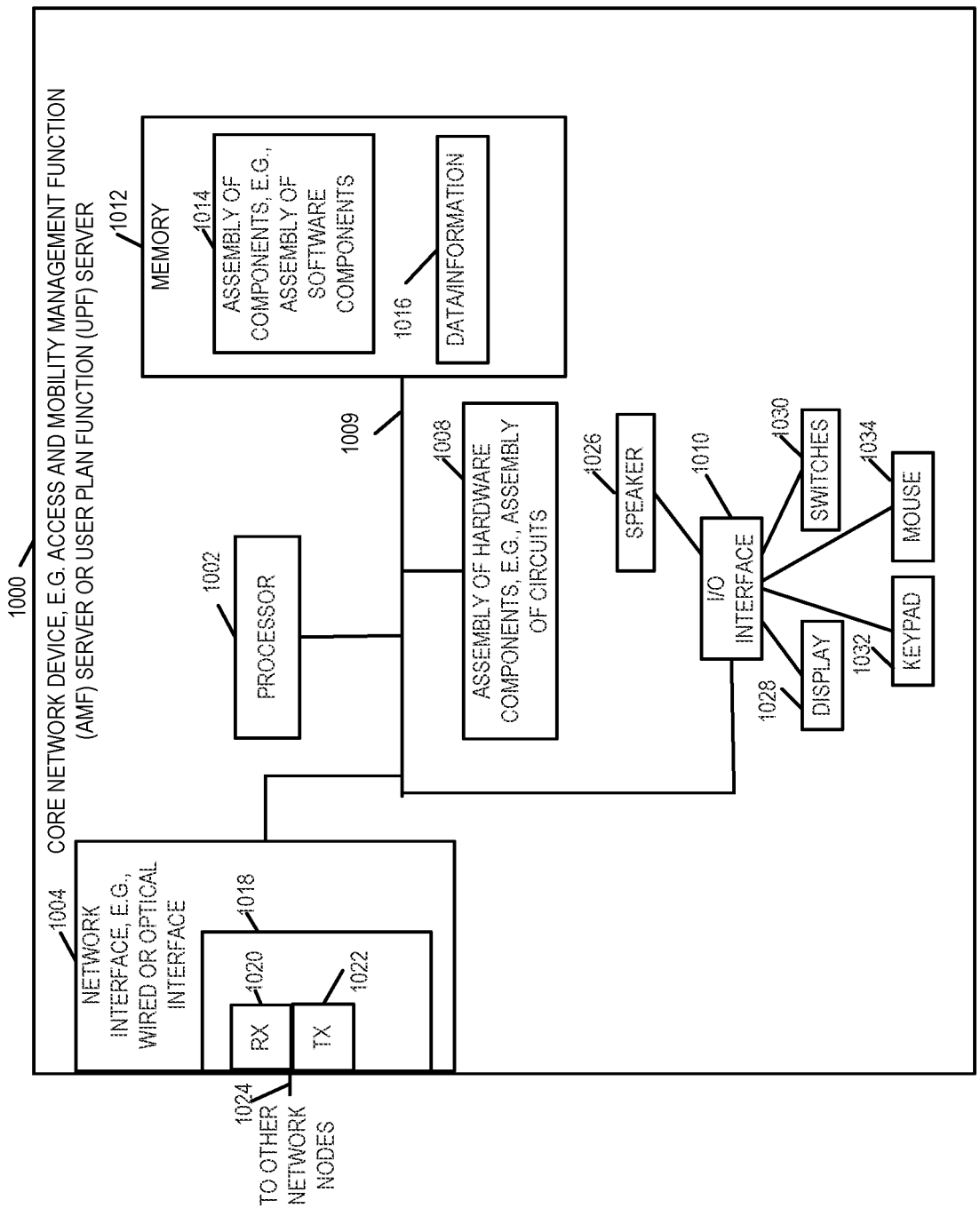
FIG. 9 is a drawing of an exemplary core network device, e.g., an access and mobility management function (AMF) server or an user plane function (UPF) server, implemented in accordance with an exemplary embodiment.

FIG. 9 is a drawing of an exemplary core network device 1000, e.g., an access and mobility management function (AMF) server or an user plane function (UPF) server, implemented in accordance with an exemplary embodiment. Exemplary core network device 1000 is, e.g. any AMF device 114 or UPF device 116 of core network 112 of system 100 shown in or described with respect to FIGS. 1-5 and/or a implementing one or more steps of the exemplary method of flowchart 600 of FIG. 6.

Exemplary core network device 1000 includes a processor 1002, e.g., a CPU, a network interface 1004, an assembly of hardware components 1008, e.g., an assembly of circuits, an I/O interface 1010 and memory 1012 coupled together via a bus 1009 over which the various elements may interchange data and information. Core network device 1000 further includes a plurality of input/output devices (speaker 1026, display 1028, e.g., a touchscreen display, keypad 1032, mouse 1034, and switches 1030) via which an operator may enter input, e.g. commands, controls, etc. and/or receive output, e.g., displays of status and results. The plurality of input/output devices (1026, 1028, 1030, 1032, 1034) are coupled, via I/O interface 1010 to bus 1009, facilitating communication with other elements, e.g., interface 1004, the processor 1002, assembly of hardware components 1008 and memory 1012, within core network device 1000.

Network interface 1004, e.g., a wired or optical interface includes a receiver 1020 and a transmitter 1022. In some embodiments, the receiver 834 and transmitter 836 are included as part of a transceiver 1018. The receiver 1020 and transmitter 1022 are coupled to output connector 1024 which coupled the network interface 806 to other network nodes, cable connection backhauls, third party networks, and/or the Internet.

Memory 1012 includes an assembly of components 1014, e.g., an assembly of software components, such as software routines, subroutines, modules and/or applications, and data/information 1016.

Figure 11:
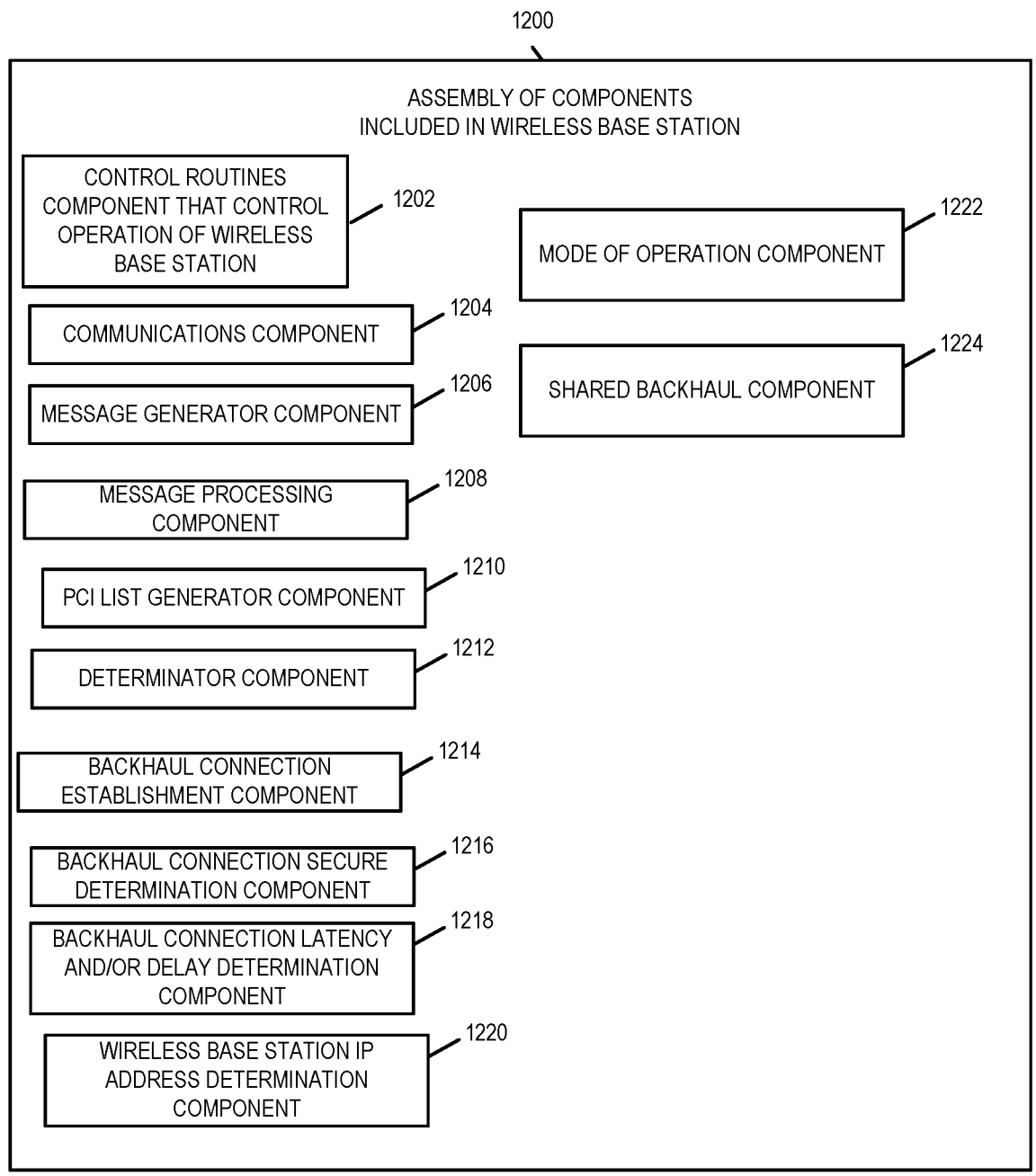
FIG. 11 is a drawing of an exemplary assembly of components which may be, and in some embodiments is, included in an exemplary wireless base station in accordance with an embodiment of the present invention.

FIG. 11 is a drawing of an exemplary assembly of components 1200 which may be included in a wireless base station, e.g., exemplary wireless base station 800 of FIG. 7, in accordance with an exemplary embodiment. The components in the assembly of components 1200 can, and in some embodiments are, implemented fully in hardware within a processor, e.g., processor 802, e.g., as individual circuits. The components in the assembly of components 1200 can, and in some embodiments are, implemented fully in hardware within the assembly of hardware components 808, e.g., as individual circuits corresponding to the different components. In other embodiments some of the components are implemented, e.g., as circuits, within processor 802 with other components being implemented, e.g., as circuits within assembly of components 808, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the wireless base station device 800, with the components controlling operation of wireless base station device 800 to implement the functions corresponding to the components when the components are executed by a processor e.g., processor 802. In some such embodiments, the assembly of components 1200 is included in the memory 812 as assembly of software components 814. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1200 is stored in the memory 812, the memory 812 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the wireless base station device 800 or elements therein such as the processor 802, to perform the functions of corresponding steps illustrated and/or described in the method of one or more of the flowcharts, signaling diagrams and/or described with respect to any of the Figures. Thus the assembly of components 1200 includes various components that perform functions or operations corresponding to one or more described and/or illustrated steps of an exemplary method.

Assembly of components 1200 includes a control routines component 1202, a communications component 1204, a message generator component 1206, a message processing component 1208, a PCI list generator component 1210, a determinator component 1212, a backhaul connection establishment component 1214, a backhaul connection secure determination component 1216, a backhaul connection latency and/or delay determination component 1218, a wireless base station IP address determination component 1220, a mode of operation component 1222, and a shared backhaul component 1224.

The control routines component 1202 is configured to control operation of the wireless base station. The communications component 1204 is configured to handle communications, e.g., transmission and reception of messages, sending of ACK and NACK messages, and protocol signaling for the wireless base station. The message generator component 1206 is configured to generate messages for transmission to other devices. The message processing component 1208 is configured to process received messages and is sometimes a sub-component of communications component 1204. The PCI list generator component 1210 generates a list of Physical Cell Identifiers from PCI information reported from user equipment devices. The determinator component 1212 sometimes referred to as a determination component makes various determinations for the wireless base station including for example, determining whether a first backhaul connection path between a first wireless base station and a core network entity of a first service provider includes a communications link which is part of a second network being operated by a different service provider, determining if a first wireless base station has received an IPSec connection request from a core network entity, determine a data transmission latency for a first backhaul connection path, determine a data transmission latency for a second backhaul connection path, determine if a data transmission latency exceeds a threshold, determine if a data transmission latency for a second backhaul connection path is less than a data transmission latency for a first backhaul connection path, etc.

The backhaul connection establishment component 1214 performs the operations necessary to establish a backhaul connection to a core network entity whether directly or via another wireless base station. In some embodiments the backhaul connection establishment component 1214 is a sub-component of the communications component 1204. The backhaul connection secure determination component 1216 determines whether a backhaul connection is secure or unsecure. In some embodiments this determination is performed by the dominator component 1212. In some embodiments, the backhaul secure connection component 1216 is a sub-component of the determinator component 1212. The backhaul connection latency and/or delay determination component 1218 determines the latency and/or delay between a wireless base station and the core network (e.g., a core network entity or device). In some embodiments, the backhaul connection latency and/or delay determination operation is performed by the determinator component 1212. In some embodiments, the backhaul connection latency and/or delay determination component 1218 is a sub-component of determinator component 1212. The wireless base station IP address determination component 1220 obtains the IP address for wireless base stations from a core network device using PCI addresses received from user equipment devices. The mode of operation component 1222 determines which mode of operation a wireless base station is to operate in a shared backhaul mode of operation or a non-shared backhaul mode of operation. In some embodiments, the functionality of the mode of operation component is performed by the determinator component 1212. In some embodiments, the mode of operation component 1222 is a sub-component of determinator component 1212. In some embodiments, the mode of operation component 1222 also places the wireless base station in the determined mode of operation. The shared backhaul component 1224 controls the wireless base station to operate in a shared backhaul mode of operation wherein the wireless base station shares its backhaul resources with another wireless base station by receiving wireless backhaul communications messages from another wireless base station which it encapsulates in its own backhaul communications messages which it then transmits to a core network entity over its backhaul communications connection.

Figure 12:
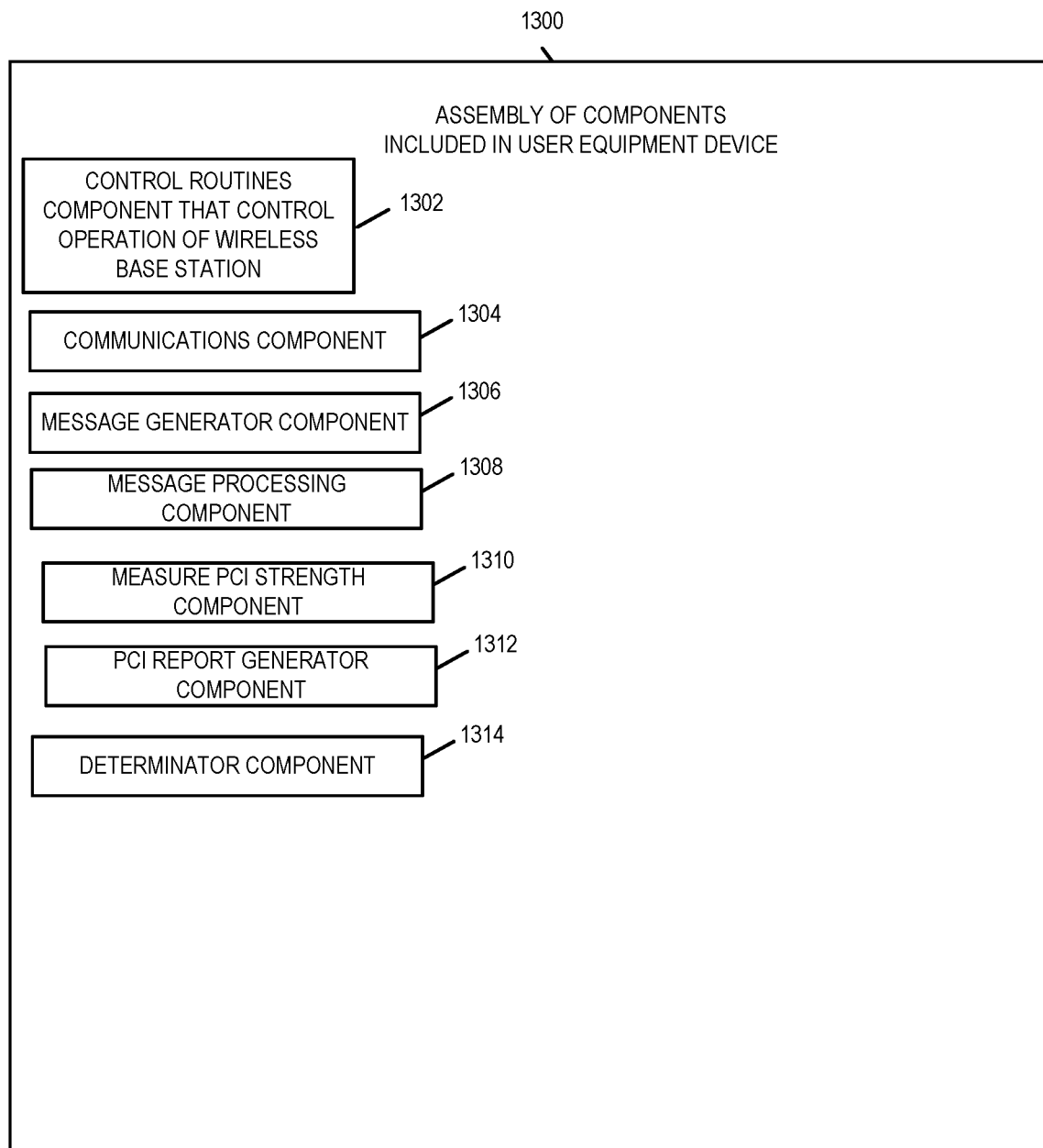
FIG. 12 is a drawing of an exemplary assembly of components which may be, and in some embodiments is, included in an exemplary user device in accordance with an embodiment of the present invention.
Figure 13:
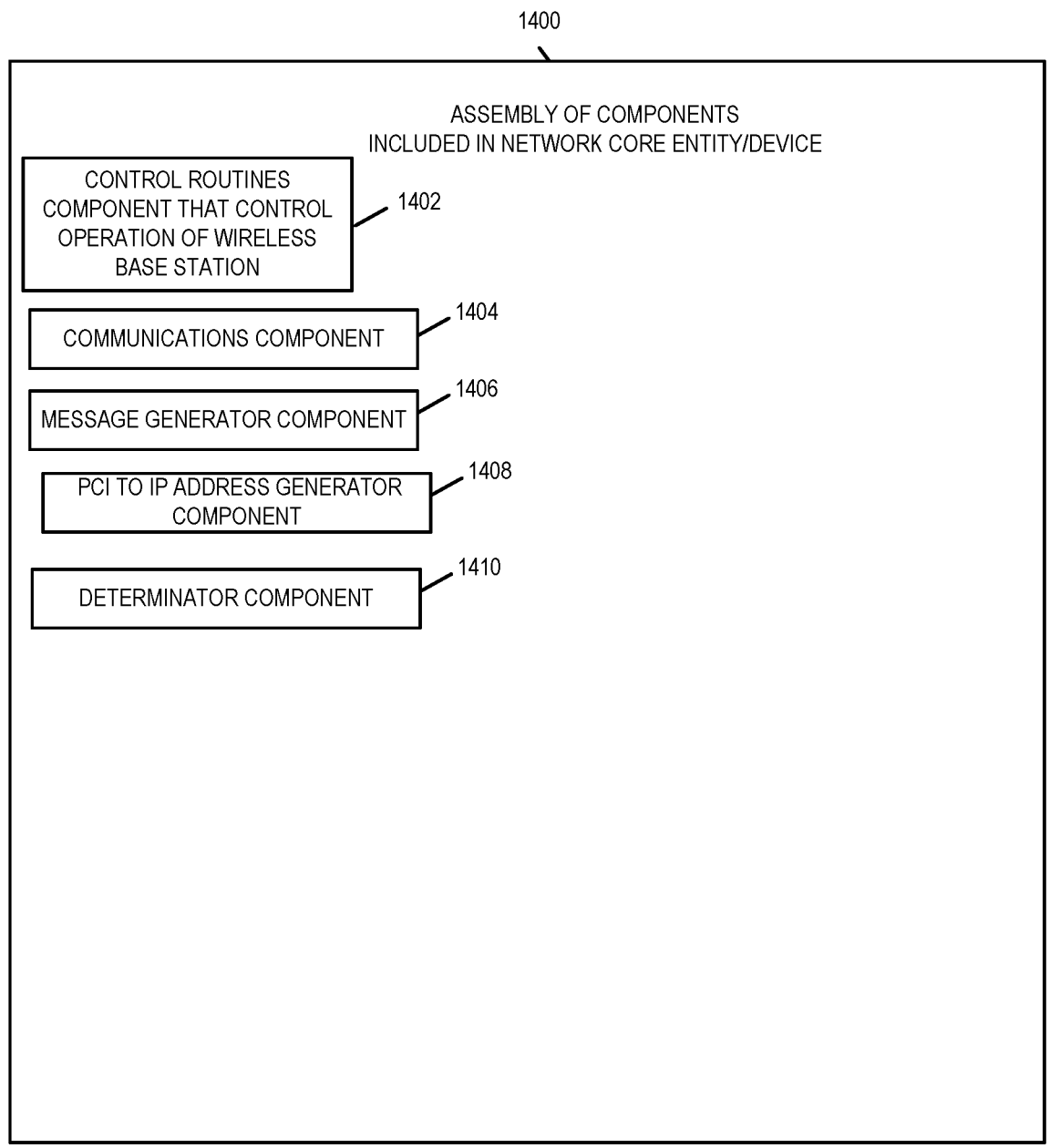
FIG. 13 is a drawing of an exemplary assembly of components which may be, and in some embodiments is, included in an exemplary core network device in accordance with an embodiment of the present invention.

FIG. 12 is a drawing of an exemplary assembly of components 1300 which may be included in a user equipment device, e.g., exemplary user equipment device 900 of FIG. 8, in accordance with an exemplary embodiment. The components in the assembly of components 1300 can, and in some embodiments are, implemented fully in hardware within a processor, e.g., processor 902, e.g., as individual circuits. The components in the assembly of components 1300 can, and in some embodiments are, implemented fully in hardware within the assembly of hardware components 908, e.g., as individual circuits corresponding to the different components. In other embodiments some of the components are implemented, e.g., as circuits, within processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the user equipment device 900, with the components controlling operation of user equipment device 900 to implement the functions corresponding to the components when the components are executed by a processor e.g., processor 902. In some such embodiments, the assembly of components 1300 is included in the memory 912 as assembly of software components 914. In still other embodiments, various components in assembly of components 1300 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1300 is stored in the memory 912, the memory 912 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the user equipment device 900 or elements therein such as the processor 902, to perform the functions of corresponding steps illustrated and/or described in the method of one or more of the flowcharts, signaling diagrams and/or described with respect to any of the Figures. Thus the assembly of components 1300 includes various components that perform functions or operations corresponding to one or more described and/or illustrated steps of an exemplary method.

Assembly of components 1300 includes a control routines component 1302, a communications component 1304, a message generator component 1306, a message processing component 1308, a measure PCI strength component 1310, a PCI information report generator component 1312, a determination component 1314.

The control routines component 1302 is configured to control operation of the user equipment device. The communications component 1304 is configured to handle communications, e.g., transmission and reception of messages, sending of ACK and NACK messages, and protocol signaling for the user equipment device. The message generator component 1306 is configured to generate messages for transmission to other devices. The message processing component 1308 is configured to process received messages and is sometimes a sub-component of communications component 1304. The PCI strength measurement component 1310 is configured to measure the strength of Physical Cell Identifiers received by the user equipment from wireless base stations. The PCI information report generator component 1312 generates a report, e.g., in some embodiments an aggregate report, including information about the different Physical Cell Identifiers the user equipment device has received from other wireless base station, the information may, and in some embodiments does include the measured strength of each PCI signal.

Figure 14A:
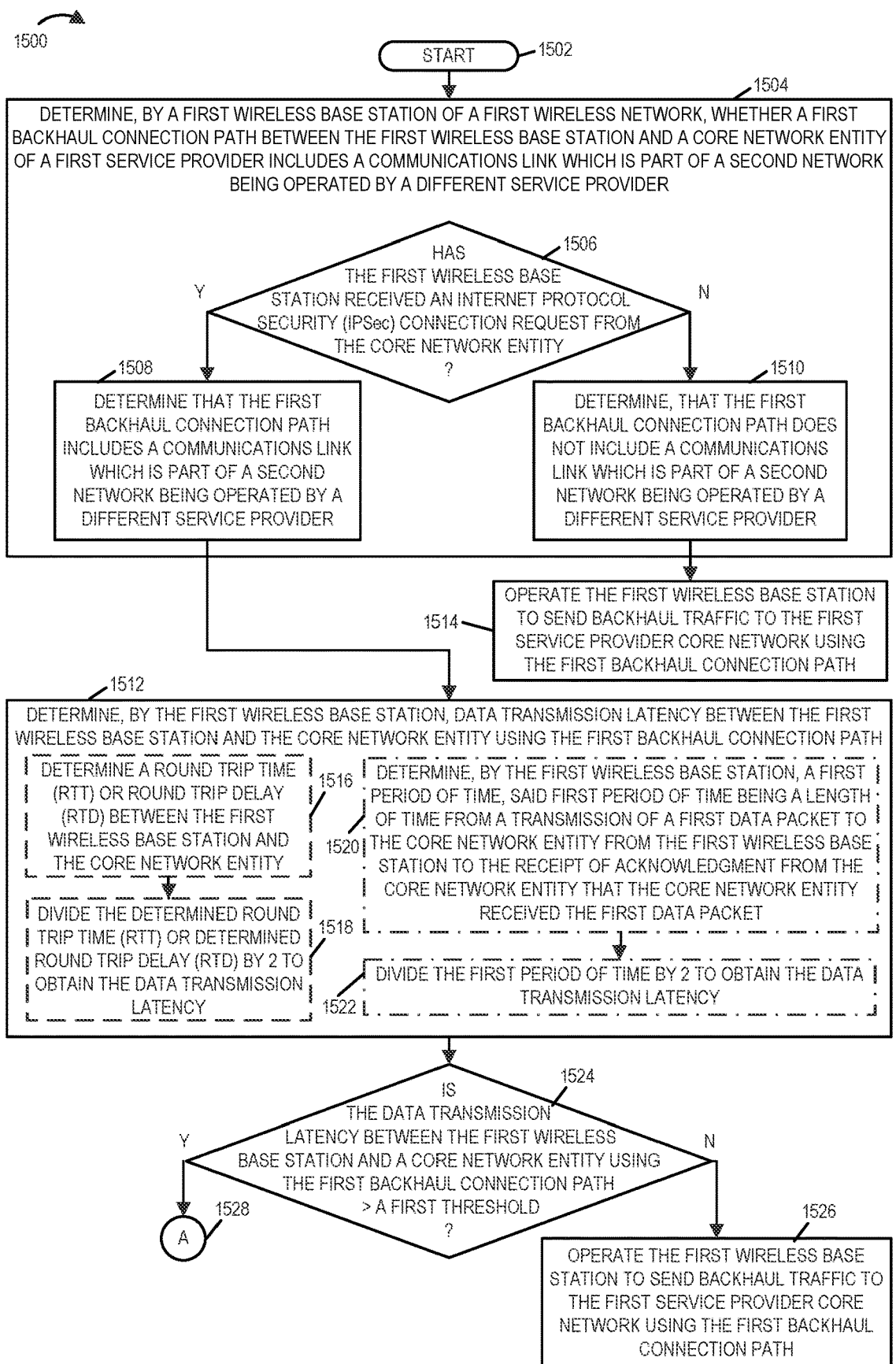
FIG. 14A is a first part of a flowchart of another exemplary communications method in accordance with an exemplary embodiment.
Figure 14B:
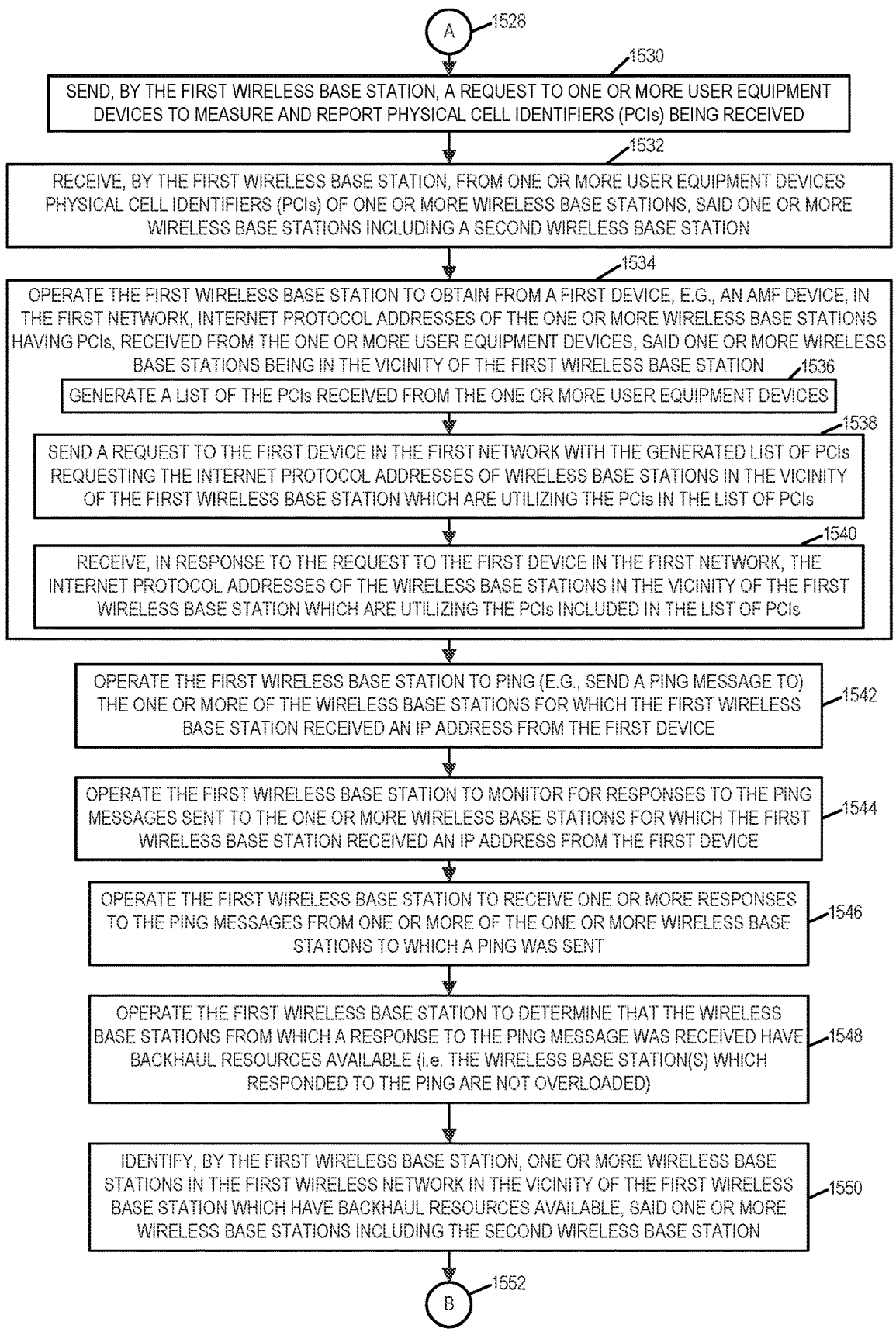
FIG. 14B is a second part of a flowchart of another exemplary communications method in accordance with an exemplary embodiment.

FIG. 14, which comprises the combination of FIGS. 14A, 14B, and 14C, illustrates another exemplary method 1500. FIG. 14A illustrates the steps of the first part of the exemplary method 1500 in accordance with one embodiment of the present invention. FIG. 14B illustrates the steps of the second part of the exemplary method 1500 in accordance with one embodiment of the present invention. FIG. 14C illustrates the steps of the third part of the exemplary method 1500 in accordance with one embodiment of the present invention.

For explanatory purposes the exemplary method 1500 will be explained in connection with the exemplary communications system 100 illustrated in FIG. 1 although it should be understood that the method may be implemented using other systems and other system configurations then those illustrated in FIG. 1. While it will be readily understood that additional steps and signaling are performed in connection with communicating information, messages, and packets between devices, the method 1500 focuses on and discusses the steps and signaling for understanding the invention.

Operation of the exemplary method starts in step 1502 in which a first wireless base station, e.g., a gNB wireless base station such as a CBSD gNB wireless base station, is powered on and initialized. In one exemplary embodiment, the first wireless base station is base station 1 102 of system 100 of FIG. 1. Operation proceeds from step 1502 to step 1504. In step 1504 the first wireless base station of a first wireless network determines whether a first backhaul connection path between the first wireless base station and a core network entity, e.g., AMF 114 or UPF 116, of a first service provider includes a communications link, e.g., link 146a, which is part of a second network, e.g., untrusted third party network 140, being operated by a different service provider. Step 1504 includes step 1506, 1508 and 1510. In step 1504 the first wireless base stations determines if it has received an Internet protocol security (IPSec) connection request from the core network entity. If the determination of step 1506 is that the first wireless base station has received and IPSec connection request from the core network entity, then operation proceeds from step 1506 to step 1508, in which the first wireless base station determines that the first backhaul connection path includes a communications link which is part of a second network being operated by a different service provider. Operation proceeds from step 1508 to step 1512. Alternatively, if the determination of step 1506 is that the first wireless base station has not received an IPSec connection request from the core network entity, then operation proceeds from step 1506 to step 1510, in which the first wireless base station determines that the first backhaul connection path dos not include a communications link which is part of a second network being operated by a different service provider. Operation proceeds from step 1510 to step 1514, in which the first base station is operated to send backhaul traffic to the first service provider core network using the first backhaul connection path.

Returning to step 1512, in step 1512 the first wireless base station determines a data transmission latency between the first wireless base station and the core network entity using the first backhaul connection path. In some embodiments, step 1512 includes steps 1516 and 1518. In some embodiments, step 1512 includes steps 1520 and 1522.

In step 1516 the first wireless base station determines a round trip time (RTT) or a round trip delay (RTD) between the first wireless base station and the core network entity. Operation proceeds from step 1516 to step 1518. In step 1518 the first wireless base station divides the determined round trip time (RTT) or the determined round trip delay (RTD) by 2 to obtain the data transmission latency.

In step 1520 the first wireless base station determines a first period of time, said first period of time being a length of time from a transmission of a first data packet to the core network entity from the first wireless base station to the receipt of acknowledgement from the core network entity that the core network entity received the first data packet. Operation proceeds from step 1520 to step 1522. In step 1522 the first wireless base station divides the first period of time by 2 to obtain the data transmission latency.

Operation proceeds from step 1512 to step 1524. In step 1524 the first wireless base station determined if the determined data transmission latency between the first wireless base station and a core network entity using the first backhaul connection path is greater than a first threshold. If the determination of step 1524 is that the determined data transmission latency between the first wireless base station and a core network entity using the first backhaul connection path is not greater than the first threshold, then operation proceeds from step 1524 to step 1526, in which the first wireless base station is operated to send backhaul traffic to the first service provider core network using the first backhaul connection path. However, if the determination of step 1524 is that the determined data transmission latency between the first wireless base station and the core network entity using the first backhaul connection path is greater than the first threshold, then operation proceeds from step 1524, via connecting node A 1528 to step 1530. In step 1530 the first wireless base station sends a request to one or more user equipment devices, e.g., UE 1 118, UE 2 120, and/or UE 3 122, to measure and report physical cell identifiers (PCIs) being received. Operation proceeds from step 1530 to step 1532. In step 1532 the first wireless base station receives from one or more of the user equipment devices physical cell identifiers (PCIs) of one or more wireless base stations, said one or more wireless base stations including a second wireless base station. Operation proceeds from step 1532 to step 1534.

In step 1534 the first wireless base station obtains from a first device in the first network, Internet protocol addresses of the one or more wireless base station having PCIs received from the one or more user equipment devices, said one or more wireless base stations being in the vicinity of the first wireless base station. In some embodiments, the first device is an access and mobility management function (AMF) device, e.g. AMF device 114 of $1^{st}$ service provider core network 112. Step 1534 includes steps 1536, 1538, and 1540. In step 1526 the first wireless base station generates a list of the PCIs received from the one or more user equipment devices. Operation proceeds from step 1536 to step 1538. In step 1538 the first wireless base station sends a request to the first device in the first network with the generated list of PCIs requesting the Internet protocol addresses of wireless base stations in the vicinity of the first wireless base station which are utilizing the PCIs in the list of PCIs. Operation proceeds from step 1538 to step 1540. In step 1540 the first wireless base station receives, in response to the request to the first device in the first network, the Internet protocol addresses of the wireless base station in the vicinity of the first wireless base stations which are utilizing the PCIs in the list of PCIs. Operation proceeds from step 1534 to step 1542.

In step 1542 the first wireless base station is operated to ping (e.g., send a ping message to) the one or more of the wireless base station for which the first wireless base station received an IP address from the first device. Operation proceeds from step 1542 to step 1544. In step 1544 the first wireless base station is operated to monitor for responses to the ping messages from one or more wireless base stations for which the first wireless base station received an IP address from the first device. Operation proceeds from step 1544 to step 1546. In step 1546 the first wireless base station is operated to receive one or more responses to the ping messages from one or more of the one or more wireless base stations to which a ping was sent. Operation proceeds from step 1546 to step 1548. In step 1548 the first wireless base station is operated to determine that the wireless base stations from which a response to the ping message was received have backhaul resources available (i.e. the wireless base station(s) which responded to the ping are not overloaded.) Operation proceeds from step 1548 to step 1550. In step 1550 the first wireless base station identifies one or more wireless base stations in the first wireless network in the vicinity of the first wireless base station which have backhaul resources available, said one or more wireless base stations including the second wireless base station. Operation proceeds from step 1550, via connecting node B 1552 to step 1554.

In step 1554 the first wireless base station is operated to send a shared backhaul request message to one of the identified one or more base stations, e.g. to the second wireless base station, e.g., base station 2 104. Operation proceeds from step 1554 to step 1556.

In step 1556 the first wireless base station is operated to receive a response message from the second base station accepting shared backhaul mode of operation. Operation proceeds from step 1556 to step 1558.

In step 1558 the first wireless base station establishes a second backhaul connection path between the first wireless base station and the core network entity, said second backhaul connection including a wireless connection to the second wireless base station which is part of the first wireless network. Step 1558 includes step 1560, in which the first wireless base station makes a wireless connection to the second wireless base station appearing as a user equipment device to second wireless base station. Operation proceeds from step 1558 to step 1562.

In step 1562 the first wireless base station determines a data transmission latency between the first wireless base station and the core network entity using the second backhaul connection path. Operation proceeds from step 1562 to step 1564.

In step 1564 the first wireless base station determines if the data transmission latency between the first wireless base station and the core network entity using the second backhaul connection is less than, equal to, or greater than the data transmission latency between the first wireless base station and the core network entity using the first backhaul connection path. If the determination of step 1564 is that the data transmission latency between the first wireless base station and the core network entity using the second backhaul connection is less than the data transmission latency between the first wireless base station and the core network entity using the first backhaul connection path, then operation proceeds from step 1564 to step 1566, in which the first wireless base station is operated to send backhaul traffic to the first service provider core network using the second backhaul connection path. However, if the determination of step 1564 is that the data transmission latency between the first wireless base station and the core network entity using the second backhaul connection is equal to or greater than the data transmission latency between the first wireless base station and the core network entity using the first backhaul connection path, then operation proceeds from step 1564 to step 1568.

In step 1568 the first wireless base station is operated to establish a third backhaul connection path to the first service provider core network via a third wireless base station, e.g., base station 4 108, said third backhaul connection path having a data transmission latency between the first wireless base station and the core network entity less than the data transmission latency between the first wireless base station and the core network entity using the first backhaul connection path. Operation proceeds from step 1568 to step 1570. In step 1570 the first wireless base station is operated to send backhaul traffic to the first service provider core network entity using the third backhaul connection path.

In some embodiments, the first wireless base station is a gNB wireless base station. In some embodiments, the first wireless network is a 5G wireless network. In some embodiments, the first wireless network is a Citizens Broadband Radio Service (CBRS) wireless network and the gNB wireless base station is a Citizens Broadband Radio Service Device (CBSD).

In various embodiment the first wireless base station is a 5G Citizens Broadband Radio Service Device deployed inside a first building by a customer or at a first fixed wireless access location.

In some embodiments, the different service provider is a cable network service provider. In some such embodiments, the communications link which is part of the second network is an optical (e.g., fiber-optic) or wired cable.

In some embodiments, the first device is an Access and Mobility Management (AMF) Function device in the first service provider's core network.

In some embodiments, the pings, the ping response messages, the shared backhaul request, and the response message to shared backhaul request message are all communicated over the first backhaul communications connection.

Various exemplary numbered embodiments illustrating different features of the present invention will now be discussed.

LIST OF EXEMPLARY NUMBERED METHOD EMBODIMENTS

Method Embodiment 1. A communications method comprising: determining, by a first wireless base station of a first wireless network, whether a first backhaul connection path between the first wireless base station and a core network entity of a first service provider includes a communications link which is part of a second network being operated by a different service provider; determining, by the first wireless base station, data transmission latency between the first wireless base station and the core network entity using the first backhaul connection path; and establishing, by the first wireless base station, a second backhaul connection path between the first wireless base station and the core network entity, said second backhaul connection including a wireless connection to a second wireless base station which is part of the first wireless network.

Method Embodiment 1A. The communications method of Method Embodiment 1, wherein the first wireless base station is a gNB wireless base station.

Method Embodiment 1AA. The communications method of Method Embodiment 1A, wherein the first wireless network is a 5G wireless network.

Method Embodiment 1AAA. The communications method of Method Embodiment 1A, wherein the first wireless network is Citizens Broadband Radio Service (CBRS) wireless network; and wherein the gNB wireless base station is a Citizens Broadband Radio Service Device (CBSD).

Method Embodiment 1B. The communications method of Method Embodiment 1, wherein the first wireless base station is a 5G Citizens Broadband Radio Service Device deployed inside a first building by a first customer or at a first fixed wireless access location.

Method Embodiment 1C. The communications method of Method Embodiment 1, wherein the different service provider is a cable network service provider.

Method Embodiment 1C1. The communication method of Method Embodiment 1C, wherein the communications link which is part of the second network is an optical (e.g., fiber-optic) or wired cable.

Method Embodiment 2. The communications method of Method Embodiment 1, wherein said second backhaul connection is only established when the data transmission latency between the first wireless base station and the core network entity using the first backhaul connection path is greater than a first threshold.

Method Embodiment 3. The communications method of Method Embodiment 1, wherein said determining, by a first wireless base station of a first wireless network, whether a first backhaul connection path between the first wireless base station and a core network entity of a first service provider includes a communications link which is part of a second network being operated by a different service provider includes: determining that the first backhaul connection path includes a communications link which is part of second network being operated by a different service provider when said first wireless base station receives an Internet Protocol Security (IPSec) connection request from the core network entity.

Method Embodiment 4. The communications method of Method Embodiment 3, wherein said determining, by the first wireless base station, data transmission latency between the first wireless base station and the core network entity using the first backhaul connection path includes: determining a Round Trip Time (RTT) or Round Trip Delay (RTD) between the first wireless base station and the core network entity; and dividing the RTT or RTD by two.

Method Embodiment 4A. The communications method of Method Embodiment 3, wherein said determining, by the first wireless base station, data transmission latency between the first wireless base station and the core network entity using the first backhaul connection path includes: determining by the first wireless base station a first period of time, said first period of time being a length of time from a transmission of a first data packet to the core network entity from the first wireless base station to the receipt by the first wireless base station of an acknowledgement from the core network entity that the core network entity received the first data packet; and dividing the first period of time by two.

Method Embodiment 5. The communications method of Method Embodiment 1, further comprising: receiving by the first wireless base station, from one or more user equipment devices physical cell identifiers (PCIs) of one or more wireless base stations, said one or more wireless base stations including the second wireless base station.

Method Embodiment 5A. The communications method of Method Embodiment 5, further comprising: prior to receiving from one or more user equipment devices physical cell identifiers (PCIs) by the first wireless base station, sending by the first wireless base station a request to the one or more user equipment devices to measure and report PCIs being received by the one or more user equipment devices.

Method Embodiment 6. The communications method of Method Embodiment 5, further comprising: obtaining from a first device in the first network, Internet Protocol addresses of the one or more wireless base stations having the PCIs received from the one or more user equipment devices, said one or more wireless base stations being in the vicinity of the first wireless base station.

Method Embodiment 6A. The communications method of Method Embodiment 6, wherein said obtaining from a first device in the first network, Internet Protocol addresses of the one or more wireless base stations having the PCIs received from the one or more user equipment devices includes: (i) generating a list of the PCIs received from the one or more user equipment devices; (ii) sending a request to the first device in the first network with the generated list of PCIs requesting the Internet Protocol addresses of wireless base stations in the vicinity of the first wireless base station which are utilizing the PCIs included in the list of PCIs; (iii) receiving in response to the request to the first device in the first network, the Internet Protocol addresses of the wireless base stations in the vicinity of the first wireless base station which are utilizing the PCIs included in the list of PCIs.

Method Embodiment 6B. The communications method of Method Embodiment 6B, wherein the first device is Access and Mobility Management Function (AMF) device in the first service provider's core network.

Method Embodiment 6C. The communications method of Method Embodiment 6B, further comprising: prior to said establishing, by the first wireless base station, a second backhaul connection path between the first wireless base station and the core network entity: (i) operating the first wireless base station to ping (e.g., send a ping message) the one or more of the wireless base stations for which the first wireless base station received an IP address from the first device; (ii) operating the first wireless base station to monitor for responses to the ping messages sent to the one or more wireless base stations for which the first wireless base station received an IP address from the first device; (iii) operating the first wireless base station to receive one or more responses to the ping messages from one or more of the one or more wireless base stations to which a ping was sent; and (iv) operating the first wireless base station to determine that the wireless base stations from which a response to the ping message was received have backhaul resources available (i.e., wireless base stations which respond to the ping are not overloaded).

Method Embodiment 7. The communications method of Method Embodiment 1, further comprising: prior to said establishing, by the first wireless base station, a second backhaul connection path between the first wireless base station and the core network entity: identifying by the first wireless base station one or more wireless base stations in the first wireless network in the vicinity of the first wireless base station which have backhaul resources available, said one or more wireless base stations including the second wireless base station.

Method Embodiment 8. The communications method of Method Embodiment 7, further comprising: prior to said establishing, by the first wireless base station, a second backhaul connection path between the first wireless base station and the core network entity: sending a shared backhaul request message to one of the identified one or more wireless base stations.

Method Embodiment 9. The communications method of Method Embodiment 8, wherein the one of the identified one or more wireless base stations is the second wireless base station.

Method Embodiment 10. The communications method of Method Embodiment 8, further comprising: receiving by the first wireless base station a response message from the second wireless base station accepting shared backhaul mode of operation.

Method Embodiment 10A. The communications method of Method Embodiment 8 wherein the pings, the ping response messages, the shared backhaul request message, and the response message to the shared backhaul request message are all communicated over the first backhaul communications connection.

Method Embodiment 11. The communications method of Method Embodiment 10, wherein establishing, by the first wireless base station, a second backhaul connection path between the first wireless base station and the core network entity includes: making a wireless connection to the second wireless base station, said first wireless base station appearing as a user equipment device to the second wireless base station.

Method Embodiment 12. The communications method of Method Embodiment 11, further comprising: determining, by the first wireless base station, data transmission latency between the first wireless base station and the core network entity using the second backhaul connection path; and determining whether the data transmission latency between the first wireless base station and the core network entity using the second backhaul connection path is less than, equal to, or greater than the data transmission latency between the first wireless base station and the core network entity using the first backhaul connection path.

Method Embodiment 13. The communications method of Method Embodiment 12, further comprising: when the first wireless base station determines the data transmission latency between the first wireless base station and the core network entity using the second backhaul connection path is less than the data transmission latency between the first wireless base station and the core network entity using the first backhaul connection path, operating the first wireless base station to send backhaul traffic to the first service provider core network using the second backhaul connection path (and wherein the second wireless base station is operating in shared backhaul mode of operation).

Method Embodiment 14. The communications method of Method Embodiment 13, further comprising: when the first wireless base station determines the data transmission latency between the first wireless base station and the core network entity using the second backhaul connection path is greater than or equal to the data transmission latency between the first wireless base station and the core network entity using the first backhaul connection path, operating the first wireless base station to establish a third backhaul connection path to the first service provider core network via a third wireless base station, said third backhaul connection path having a data transmission latency between the first wireless base station and the core network entity less than the data transmission latency between the first wireless base station and the core network entity using the first backhaul connection path.

List of Exemplary Numbered System Embodiments

System Embodiment 1. A wireless communications system comprising: a first wireless base station of a first wireless network including: (i) memory; and (ii) a processor that controls the first wireless base station to perform the following operations: determining whether a first backhaul connection path between the first wireless base station and a core network entity of a first service provider includes a communications link which is part of a second network being operated by a different service provider; determining data transmission latency between the first wireless base station and the core network entity using the first backhaul connection path; and establishing a second backhaul connection path between the first wireless base station and the core network entity, said second backhaul connection including a wireless connection to a second wireless base station which is part of the first wireless network.

System Embodiment 1A. The communications system of System Embodiment 1, wherein the first wireless base station is a gNB wireless base station.

System Embodiment 1AA. The communications system of System Embodiment 1A, wherein the first wireless network is a 5G wireless network.

System Embodiment 1AAA. The communications system of System Embodiment 1A, wherein the first wireless network is Citizens Broadband Radio Service (CBRS) wireless network; and wherein the gNB wireless base station is a Citizens Broadband Radio Service Device (CBSD).

System Embodiment 1B. The communications system of System Embodiment 1, wherein the first wireless base station is a 5G Citizens Broadband Radio Service Device deployed inside a first building by a first customer or at a first fixed wireless access location.

System Embodiment 1C. The communications system of System Embodiment 1, wherein the different service provider is a cable network service provider.

System Embodiment 1C1. The communication system of System Embodiment 1C, wherein the communications link which is part of the second network is an optical (e.g., fiber-optic) or wired cable.

System Embodiment 2. The communications system of System Embodiment 1, wherein said second backhaul connection is only established when the data transmission latency between the first wireless base station and the core network entity using the first backhaul connection path is greater than a first threshold.

System Embodiment 3. The communications system of System Embodiment 1, wherein said determining whether a first backhaul connection path between the first wireless base station and a core network entity of a first service provider includes a communications link which is part of a second network being operated by a different service provider includes: determining that the first backhaul connection path includes a communications link which is part of second network being operated by a different service provider when said first wireless base station receives an Internet Protocol Security (IPSec) connection request from the core network entity.

System Embodiment 4. The communications system of System Embodiment 3, wherein said determining data transmission latency between the first wireless base station and the core network entity using the first backhaul connection path includes: determining the Round Trip Time (RTT) or Round Trip Delay (RTD) between the first wireless base station and the core network entity; and dividing the RTT or RTD by two.

System Embodiment 4A. The communications system of System Embodiment 3, wherein said determining data transmission latency between the first wireless base station and the core network entity using the first backhaul connection path includes: determining by the first wireless base station a first period of time, said first period of time being a length of time from a transmission of a first data packet to the core network entity from the first wireless base station to the receipt by the first wireless base station of an acknowledgement from the core network entity that the core network entity received the first data packet; and dividing the first period of time by two.

System Embodiment 5. The communications system of System Embodiment 1, wherein said processor further controls the first wireless base station to perform the additional operation of: receiving from one or more user equipment devices physical cell identifiers (PCIs) of one or more wireless base stations, said one or more wireless base stations including the second wireless base station.

System Embodiment 5A. The communications system of System Embodiment 5, wherein said processor further controls the first wireless base station to perform the addition operation of: prior to receiving from one or more user equipment devices physical cell identifiers (PCIs) by the first wireless base station, sending by the first wireless base station a request to the one or more user equipment devices to measure and report PCIs being received by the one or more user equipment devices.

System Embodiment 6. The communications system of System Embodiment 5, wherein the processor further controls the first wireless base station perform the additional operation of: obtaining from a first device in the first network, Internet Protocol addresses of the one or more wireless base stations having the PCIs received from the one or more user equipment devices, said one or more base stations being in the vicinity of the first wireless base station.

System Embodiment 6A. The communications system of System Embodiment 6, wherein said obtaining from a first device in the first network, Internet Protocol addresses of the one or more wireless base stations having the PCIs received from the one or more user equipment devices includes: (i) generating a list of the PCIs received from the one or more user equipment devices; (ii) sending a request to the first device in the first network with the generated list of PCIs requesting the Internet Protocol addresses of wireless base stations in the vicinity of the first wireless base station which are utilizing the PCIs included in the list of PCIs; (iii) receiving in response to the request to the first device in the first network, the Internet Protocol addresses of the wireless base stations in the vicinity of the first wireless base station which are utilizing the PCIs included in the list of PCIs.

System Embodiment 6B. The communications system of System Embodiment 6B, wherein the first device is Access and Mobility Management Function (AMF) device in the first service provider's core network.

System Embodiment 6C. The communications system of System Embodiment 6B, wherein the processor further controls the first wireless base station to perform the following additional operations: prior to said establishing, by the first wireless base station, a second backhaul connection path between the first wireless base station and the core network entity: (i) operating the first wireless base station to ping (e.g., send a ping message) the one or more of the wireless base stations for which the first wireless base station received an IP address from the first device; (ii) operating the first wireless base station to monitor for responses to the ping messages sent to the one or more wireless base stations for which the first wireless base station received an IP address from the first device; (iii) operating the first wireless base station to receive one or more responses to the ping messages from one or more of the one or more wireless base stations to which a ping was sent; and (iv) operating the first wireless base station to determine that the wireless base stations from which a response to the ping message was received have backhaul resources available (i.e., wireless base stations which respond to the ping are not overloaded).

System Embodiment 7. The communications system of System Embodiment 1, wherein the processor further controls the first wireless base station to perform the following additional operations: prior to said establishing, by the first wireless base station, a second backhaul connection path between the first wireless base station and the core network entity: identifying by the first wireless base station one or more wireless base stations in the first wireless network in the vicinity of the first wireless base station which have backhaul resources available, said one or more wireless base stations including the second wireless base station.

System Embodiment 8. The communications system of System Embodiment 7, wherein the processor further controls the first wireless base station to perform the following additional operations: prior to said establishing, by the first wireless base station, a second backhaul connection path between the first wireless base station and the core network entity: sending a shared backhaul request message to one of the identified one or more wireless base stations.

System Embodiment 9. The communications system of System Embodiment 8, wherein the one of the identified one or more wireless base stations is the second wireless base station.

System Embodiment 10. The communications system of System Embodiment 8, wherein the processor further controls the first wireless base station to perform the following operation: receiving by the first wireless base station a response message from the second wireless base station accepting shared backhaul mode of operation.

System Embodiment 10A. The communications system of System Embodiment 8 wherein the pings, the ping response messages, the shared backhaul request message, and the response message to the shared backhaul request message are all communicated over the first backhaul communications connection.

System Embodiment 11. The communications system of System Embodiment 10, wherein said establishing a second backhaul connection path between the first wireless base station and the core network entity includes: making a wireless connection to the second wireless base station, said first wireless base station appearing as a user equipment device to the second wireless base station.

System Embodiment 12. The communications system of System Embodiment 11, wherein the processor further controls the first wireless base station to perform the additional operations of: determining, by the first wireless base station, data transmission latency between the first wireless base station and the core network entity using the second backhaul connection path; and determining whether the data transmission latency between the first wireless base station and the core network entity using the second backhaul connection path is less than, equal to, or greater than the data transmission latency between the first wireless base station and the core network entity using the first backhaul connection path.

System Embodiment 13. The communications system of System Embodiment 12, wherein the processor further controls the first wireless base station to perform the additional operation of: operating the first wireless base station to send backhaul traffic to the first service provider core network using the second backhaul connection when the first wireless base station determines the data transmission latency between the first wireless base station and the core network entity using the second backhaul connection path is less than the data transmission latency between the first wireless base station and the core network entity using the first backhaul connection path, (and wherein the second wireless base station is operating in shared backhaul mode of operation).

System Embodiment 14. The communications system of System Embodiment 13, wherein the processor further controls the first wireless base station to perform the additional operation of: establishing a third backhaul connection path to the first service provider core network via a third wireless base station when the first wireless base station determines the data transmission latency between the first wireless base station and the core network entity using the second backhaul connection path is greater than or equal to the data transmission latency between the first wireless base station and the core network entity using the first backhaul connection path; and wherein said third backhaul connection path has a data transmission latency between the first wireless base station and the core network entity less than the data transmission latency between the first wireless base station and the core network entity using the first backhaul connection path.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a first wireless base station cause the first wireless base station to perform the steps of: determining whether a first backhaul connection path between the first wireless base station and a core network entity of a first service provider includes a communications link which is part of a second network being operated by a different service provider; determining data transmission latency between the first wireless base station and the core network entity using the first backhaul connection path; and establishing a second backhaul connection path between the first wireless base station and the core network entity, said second backhaul connection including a wireless connection to a second wireless base station which is part of the first wireless network.

The techniques of various embodiments may be implemented using software, hardware and/or a combination of software and hardware. Various embodiments are directed to apparatus, e.g., wireless base stations, wireless devices, mobile terminals, sensors, vehicles, user equipment, CBSDs, CBRS tower base stations, CBRS CPE devices, user devices, subscriber devices, servers, nodes and/or elements. Various embodiments are also directed to methods, e.g., method of controlling and/or operating wireless base stations, wireless devices, mobile terminals, sensors, vehicles, user equipment, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements are configured to perform the steps of the methods described as being performed by the wireless base stations, wireless devices, mobile terminals, sensors, vehicles, user equipment, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, sensors, vehicles, user equipment, CBSDs, CBRS tower base stations, CBRS CPE devices, SAS devices, user devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
    determining, by a first wireless base station of a first wireless network, whether a first backhaul connection path between the first wireless base station and a core network entity of a first service provider includes a communications link which is part of a second network being operated by a different service provider;
    determining, by the first wireless base station, data transmission latency between the first wireless base station and the core network entity using the first backhaul connection path;
    sending a shared backhaul request message to a second wireless base station;
    receiving, by the first wireless base station, a response message from the second wireless base station accepting shared backhaul mode of operation; and
    establishing, by the first wireless base station, a second backhaul connection path between the first wireless base station and the core network entity, said second backhaul connection path including a wireless connection to the second wireless base station which is part of the first wireless network.

2. The communications method of claim 1, wherein prior to establishing, by the first wireless base station, the second backhaul connection path between the first wireless base and the core network entity, determining that the first backhaul connection path between the first wireless base station and the core network entity of the first service provider is an untrusted communications path.

3. The communications method of claim 2, further comprising:
    utilizing, by the first wireless base station, an Internet Protocol Security (IPSec) protocol to secure backhaul data communications over the first backhaul connection path when the first backhaul connection path is determined to be an untrusted communications path.

4. The communications method of claim 1, further comprising:
    determining by the first wireless base station, data transmission latency between the first wireless base station and the core network entity using the second backhaul connection path;
    comparing, by the first wireless base station, the data transmission latency of the first backhaul connection path to the data transmission latency of the second backhaul connection path; and
    utilizing the second backhaul connection path to communicate data from the first wireless base station to a core network in which the core network entity is located when the second backhaul connection path has a lower latency than the first backhaul connection path.

5. The communications method of claim 1, wherein said second backhaul connection path is only established when the data transmission latency between the first wireless base station and the core network entity using the first backhaul connection path is greater than a first threshold.

6. The communications method of claim 1, wherein the first wireless base station is a wireless base station deployed inside a first building by a first customer or is deployed at a first fixed wireless access location.

7. The communications method of claim 6, wherein the different service provider is a cable network service provider.

8. The communications method of claim 7, wherein the communications link which is part of the second network is an optical or wired cable.

9. The communications method of claim 1, wherein said shared backhaul request message requests that the recipient of the shared backhaul request message operate in a shared backhaul mode of operation.

10. The communications method of claim 1, further comprising:
    identifying, by the first wireless base station, that the second wireless base station has backhaul resources available prior to said establishing a second backhaul connection path between the first wireless base station and the core network entity.

11. The communications method of claim 1, further comprising:
  determining, by the first wireless base station, that data transmission latency between the first wireless base station and the core network entity using the second backhaul connection path is greater than or equal to data transmission latency between the first wireless base station and the core network entity using the first backhaul connection path; and
  operating the first wireless base station to establish a third backhaul connection path to the first service provider core network via a third wireless base station when the data transmission latency between the first wireless base station and the core network entity using the second backhaul connection path is determined to be greater than or equal to data transmission latency between the first wireless base station and the core network entity using the first backhaul connection path, said third backhaul connection path having a data transmission latency between the first wireless base station and the core network entity less than the data transmission latency between the first wireless base station and the core network entity using the first backhaul connection path.

12. A communications system comprising:
  a first wireless base station of a first wireless network including:
    (i) memory; and
    (ii) a processor that controls the first wireless base station to perform the following operations:
      determining whether a first backhaul connection path between the first wireless base station and a core network entity of a first service provider includes a communications link which is part of a second network being operated by a different service provider;
      determining data transmission latency between the first wireless base station and the core network entity using the first backhaul connection path;
      sending a shared backhaul request message to a second wireless base station;
      receiving a response message from the second wireless base station accepting shared backhaul mode of operation; and
      establishing a second backhaul connection path between the first wireless base station and the core network entity, said second backhaul connection path including a wireless connection to the second wireless base station which is part of the first wireless network.

13. The communications system of claim 12, wherein the processor further controls the first wireless base station to perform the following additional operation:
  prior to said establishing, by the first wireless base station, the second backhaul connection path between the first wireless base station and the core network entity, determining that the first backhaul connection path between the first wireless base station and the core network entity of the first service provider is an untrusted communications path.

14. The communications system of claim 13, wherein the processor further controls the first wireless base station to perform the following additional operation:
  utilizing, by the first wireless base station, an Internet Protocol Security (IPSec) protocol to secure backhaul data communications over the first backhaul connection path when the first backhaul connection path is determined to be an untrusted communications path.

15. The communications system of claim 12, wherein the processor further controls the first wireless base station to perform the following additional operations:
  determining data transmission latency between the first wireless base station and the core network entity using the second backhaul connection path;
  comparing the data transmission latency of the first backhaul connection path to the data transmission latency of the second backhaul connection path; and
  utilizing the second backhaul connection path to communicate data from the first wireless base station to a core network in which the core network entity is located when the second backhaul connection path has a lower latency than the first backhaul connection path.

16. The communications system of claim 12, wherein said second backhaul connection path is only established when the data transmission latency between the first wireless base station and the core network entity using the first backhaul connection path is greater than a first threshold.

17. The communications system of claim 12, wherein the different service provider is a cable network service provider.

18. The communications system of claim 17, wherein the communications link which is part of the second network is an optical or wired cable.

19. A non-transitory computer readable medium including a first set of computer executable instructions which when executed by a processor of a first wireless base station of a first wireless network cause the first wireless base station to perform the steps of:
  determining whether a first backhaul connection path between the first wireless base station and a core network entity of a first service provider includes a communications link which is part of a second network being operated by a different service provider;
  determining data transmission latency between the first wireless base station and the core network entity using the first backhaul connection path;
  sending a shared backhaul request message to a second wireless base station;
  receiving a response message from the second wireless base station accepting shared backhaul mode of operation; and
  establishing a second backhaul connection path between the first wireless base station and the core network entity, said second backhaul connection path including a wireless connection to a second wireless base station which is part of the first wireless network.

20. The communications system of claim 12,
  wherein said shared backhaul request message requests that the recipient of the shared backhaul request message operate in a shared backhaul mode of operation; and
  wherein the processor further controls the first wireless base station to perform the following additional operations:
    determining that data transmission latency between the first wireless base station and the core network entity using the second backhaul connection path is greater than or equal to data transmission latency between the first wireless base station and the core network entity using the first backhaul connection path; and
    establishing a third backhaul connection path to the first service provider core network via a third wireless base station when the data transmission latency between the first wireless base station and the core network entity using the second backhaul connection path is determined to be greater than or equal to data transmission latency between the first wireless base station and the core network entity using the first backhaul connection path, said third backhaul connection path having a data transmission latency between the first wireless base station and the core network entity less than the data transmission latency between the first wireless base station and the core network entity using the first backhaul connection path.

* * * * *